US011470789B2

(12) United States Patent
Buj

(10) Patent No.: US 11,470,789 B2
(45) Date of Patent: Oct. 18, 2022

(54) SYSTEM FOR PROVIDING CONTROLLED ENVIRONMENT TO GROW PLANTS AND APPARATUS THEREFOR

(71) Applicant: Denis Buj, Windsor (CA)

(72) Inventor: Denis Buj, Windsor (CA)

( * ) Notice: Subject to any disclaimer, the term of this patent is extended or adjusted under 35 U.S.C. 154(b) by 290 days.

(21) Appl. No.: 16/393,911

(22) Filed: Apr. 24, 2019

(65) Prior Publication Data
US 2019/0320605 A1 Oct. 24, 2019

Related U.S. Application Data

(60) Provisional application No. 62/661,747, filed on Apr. 24, 2018.

(51) Int. Cl.
| | |
|---|---|
| *A01G 31/02* | (2006.01) |
| *A01G 9/24* | (2006.01) |
| *A01G 25/16* | (2006.01) |
| *A01G 31/00* | (2018.01) |

(52) U.S. Cl.
CPC ............. *A01G 31/02* (2013.01); *A01G 9/241* (2013.01); *A01G 9/247* (2013.01); *A01G 9/249* (2019.05); *A01G 25/16* (2013.01); *A01G 2031/006* (2013.01)

(58) Field of Classification Search
CPC .......... A01G 9/24; A01G 9/241; A01G 9/247; A01G 9/249; A01G 9/26; A01G 2031/006; A01G 31/02; A01G 31/047
USPC .................................. 47/62 R, 63, 21.1, 29.5
See application file for complete search history.

(56) References Cited

U.S. PATENT DOCUMENTS

| | | | | | |
|---|---|---|---|---|---|
| 3,909,978 | A | * | 10/1975 | Fleming ............... | A01G 31/047 47/82 |
| 4,135,331 | A | * | 1/1979 | Lamlee .................. | A01G 31/02 47/61 |
| 4,258,501 | A | * | 3/1981 | Brown .................. | A01G 31/047 47/84 |
| 4,969,290 | A | * | 11/1990 | Skoretz .................... | A01G 9/04 108/20 |
| 5,896,699 | A | * | 4/1999 | Livingston ............. | A47G 7/041 47/39 |
| 6,128,854 | A | * | 10/2000 | Chaney .................. | A47G 7/041 47/39 |
| 9,591,815 | B2 | * | 3/2017 | Fujiyama ................. | A01G 9/00 |
| 2005/0039397 | A1 | * | 2/2005 | Roy ........................ | A01G 31/02 47/62 R |

(Continued)

*Primary Examiner* — Lisa L Tsang
(74) *Attorney, Agent, or Firm* — Aidenbaum Schloff and Bloom PLLC

(57) ABSTRACT

An apparatus and system for growing plants in a controlled environment comprises an enclosure, at least one basket for receiving plant material to be grown in the apparatus, and at least one cassette for receiving a basket therein. The apparatus further comprises a drive mechanism, said drive mechanism operatively coupled to the at least one basket and/or the at least one cassette, that imparts a drive force to cause the at least one basket to rotate in the at least one cassette and in the enclosure. The apparatus and system also include a climate-control mechanism that may include a light source, a fan, a ventilation system, an air passage, and ductwork. The apparatus and system also include a trough with a sump for drainage of the trough, an intake aperture, a baffle, a closure, an air intake sleeve, and an intake fan.

14 Claims, 24 Drawing Sheets

(56) References Cited

U.S. PATENT DOCUMENTS

| | | | |
|---|---|---|---|
| 2009/0151244 A1* | 6/2009 | Jesness, III | A01G 27/006 47/65 |
| 2011/0056132 A1* | 3/2011 | Gardner | A01G 31/02 47/62 R |
| 2011/0232190 A1* | 9/2011 | Pindus | A01G 31/02 47/62 A |
| 2014/0196363 A1* | 7/2014 | Chung | A01G 31/047 47/1.7 |
| 2014/0318012 A1* | 10/2014 | Fujiyama | A01G 9/249 47/62 R |
| 2017/0223912 A1* | 8/2017 | Gagne | A01G 25/16 |
| 2018/0288948 A1* | 10/2018 | Croteau | A01G 27/003 |
| 2019/0200542 A1* | 7/2019 | Hall | A01G 29/00 |
| 2020/0037514 A1* | 2/2020 | Massey | A01G 9/249 |

\* cited by examiner

COMPLETE ASSEMBLY
ISOMETRIC VIEW A

LID SUB-ASSEMBLY
EXPLODED VIEW

LID SUB-ASSEMBLY
INVERTED-ISOMETRIC VIEW

LID SUB-ASSEMBLY
ISOMETRIC VIEW

MOTOR DRIVEN CASSETTE SUB-ASSEMBLY
EXPLODED VIEW

MOTOR DRIVEN CASSETTE SUB-ASSEMBLY
ISOMETRIC VIEW

MOTOR DRIVEN CASSETTE SUB-ASSEMBLY
EXPLODED VIEW-B

COMPLETE ASSEMBLY
ISOMETRIC VIEW - OPEN DOORS

COMPLETE ASSEMBLY
FRONT VIEW - DOORS OPEN

STANDARD CASSETTE SUB-ASSEMBLY
EXPLODED VIEW

STANDARD CASSETTE SUB-ASSEMBLY
EXPLODED VIEW-B

STANDARD CASSETTE SUB-ASSEMBLY
ISOMETRIC VIEW - A

STANDARD CASSETTE SUB-ASSEMBLY
ISOMETRIC VIEW - B

TROUGH SUB-ASSEMBLY
EXPLODED VIEW

TROUGH SUB-ASSEMBLY
INVERTED-EXPLODED VIEW

TROUGH SUB-ASSEMBLY
INVERTED-ISOMETRIC VIEW

TROUGH SUB-ASSEMBLY
ISOMETRIC VIEW

SYSTEM FOR PROVIDING CONTROLLED ENVIRONMENT TO GROW PLANTS AND APPARATUS THEREFOR

CROSS REFERENCE TO RELATED APPLICATIONS

The present disclosure claims priority under 35 U.S.C. § 119 on U.S. Provisional Application Ser. No. 62/661,747, filed on Apr. 24, 2019, the disclosure of which is incorporated by reference.

FIELD OF THE DISCLOSURE

The present disclosure relates generally to horticulture equipment, and, more particularly, to an aeroponic/hydroponic system for providing a controlled environment to grow plants and an apparatus therefor.

BACKGROUND OF THE DISCLOSURE

Recent developments in the field of horticulture have yielded new methods of growing plants. For example, hydroponics is one such method which includes growing plants without the help of soil. People may use hydroponics for indoor cultivation of fruits, vegetables, flowers, and ornamental plants as a hobby or as a professional activity. Various hydroponic systems are known in the art that utilize customized apparatuses for growing plants hydroponically by directly supplying nutrient fluid to root portions of the plants. Such hydroponic systems may utilize a nutrient feeding mechanism for supplying nutrient fluid to the root portions of the plants. In a typical hydroponic system, the nutrient feeding mechanism may be a container storing nutrient solution therein such that the root portions of the plants may be submerged in the nutrient solution for a hydroponic growth thereof.

Most of the hydroponic systems known in the art lack a proper nutrient feeding mechanism capable of appropriately feeding nutrient fluid to the root portions of the plants. For example, it is important that the delivery of the nutrient fluid to the root portions should neither exceed a required level, nor should the root portions be deprived of nutrient fluid. Accordingly, an appropriate nutrient feeding mechanism for delivering a controlled amount of nutrient fluid to the root portions of the plants is desirable.

Further, most of the customized apparatuses utilized in hydroponic systems known in the art are open configuration that lacks a cover arrangement for enclosing the plants. Use of such customized apparatuses may have adverse effects on the growth of the plant. More specifically, in the customized apparatuses, the plant foliage may be exposed to ambient light or noise while undergoing a dark reaction, thereby causing stress related effects on the growth of the plants. Accordingly, most of the customized apparatuses are not able to regulate the amount of light incident on the plant foliage. Furthermore, the customized apparatuses lack air regulating systems that are capable of providing fresh air for better growth of the plants. Moreover, the customized apparatuses know in the art are generally large in size, and accordingly, require more space for accommodation and involve high cost of manufacturing. Additionally, most of the customized apparatuses are immobile and are not aesthetically pleasing.

Accordingly, there exists a need for a hydroponic system for growing plants that is capable of providing a controlled amount of nutrient fluid to the plants and regulating the amount of light incident on the plants. Additionally, there exists a need for an apparatus for growing plants hydroponically that is adapted to be utilized in the hydroponic system for growing plants hydroponically such that the apparatus is compact in size, cost effective, mobile, aesthetically pleasing, and enables better growth of the plants.

SUMMARY OF THE DISCLOSURE

In view of the foregoing disadvantages inherent in the prior art, the general purpose of the present disclosure is to provide a system for providing a controlled environment to grow plants and an apparatus therefor, which are configured to include all the advantages of the prior art, and to overcome the drawbacks inherent therein.

Accordingly, an object of the present disclosure is to provide an aeroponic/hydroponic system capable of providing a controlled environment to grow plants. Another object of the present disclosure is to provide an apparatus for growing plants aeroponically or hydroponically that is adapted to be utilized in an aeroponic/hydroponic system.

In light of the above objects, in one aspect of the present disclosure, an aeroponic/hydroponic system for providing a controlled environment to grow plants is disclosed. The system comprises an apparatus for growing plants hydroponically (herein after referred to an apparatus). The apparatus comprises a support structure, a trough, a lid, at least one pair of baskets (which baskets may receive the plant material to be grown in the apparatus), a drive mechanism, a motor, and a control mechanism support assembly. The apparatus may further comprise sliding doors or other suitable components to form an enclosure for a controlled growing environment in which the baskets and plant material may be disposed.

In a further embodiment, the apparatus may comprise at least one climate control mechanism, such as a fan, ventilation system, air passages, ductwork and the like. It will be apparent that the at least one climate control mechanism may be adjustable and may allow the user to vary and customize the environment and conditions within the apparatus to optimize the environment for growing plants therein.

The apparatus allows for growing conditions in which a plurality of plants can be rotated about their respective axis synchronously, thus permitting growing of a number of plants at once and permitting full exposure of the entirety of all of the plants to a light and/or nutrient source. In such fashion, the growing process is optimized and improved over prior art growing apparatuses, which prior art apparatuses do not provide for rotating a plurality of plants simultaneously within an enclosed chamber. The growing conditions created by the system and apparatus disclosed herein also improves irrigation of plant roots, strengthening of plant stalks, cooling and airflow over the plants being grown, and reducing or eliminating instances of burning or over-exposure of the plants during the growing process.

These together with other aspects of the present disclosure, along with the various features of novelty that characterize the present disclosure, are pointed out with particularity in the claims annexed hereto and form a part of this present disclosure. For a better understanding of the present disclosure, its operating advantages, and the specific objects attained by its uses, reference should be made to the accompanying drawings and descriptive matter in which there are illustrated exemplary embodiments of the present disclosure.

DESCRIPTION OF THE DRAWINGS

The advantages and features of the present disclosure will become better understood with reference to the following detailed description and claims taken in conjunction with the accompanying drawings, in which like reference numerals refer to like parts throughout the description of several views of the drawings and in which

DETAILED DESCRIPTION OF THE DISCLOSURE

The exemplary embodiments described herein detail for illustrative purposes are subject to many variations in implementation thereof. It should be emphasized, however, that the present disclosure is not limited to a hydroponic system for growing plants in a controlled manner and an apparatus for growing plants hydroponically, as shown and described. It is understood that various omissions and substitutions of equivalents are contemplated as circumstances may suggest or render expedient, but these are intended to cover the application or implementation without departing from the spirit or scope of the claims of the present disclosure.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The present disclosure provides for an aeroponic/hydroponic system for providing a controlled environment to grow plants is disclosed. As used herein, the term "controlled environment" used herein refers to an environment provided to the plants which enables in a uniform and a controlled growth of the plants. In an embodiment, the controlled environment refers to regulating an amount of nutrient fluid being supplied to root portions of the plants for enabling proper hydroponic growth thereof. Moreover, the controlled environment includes regulation of ambient air, light, and temperature in the vicinity of the plants. Such controlled environment avoids various adverse and stress related effects on the plants' growth, thereby enabling better growth of the plants.

The system comprises an apparatus 1000 for growing plants hydroponically (herein after referred to an apparatus.) In an embodiment, the apparatus comprises a support structure, a trough, a lid, at least one pair of baskets (which baskets may receive the plant material to be grown in the apparatus), a drive mechanism, a motor, and a control mechanism. The apparatus may further comprise sliding doors or other suitable components to form an enclosure for a controlled growing environment in which the baskets and plant material may be disposed.

In a further embodiment, the apparatus may comprise at least one climate control mechanism, such as a light source, a fan, ventilation system, air passages, ductwork and the like. It will be apparent that the at least one climate control mechanism may be adjustable and may allow the user to vary and customize the controlled environment and conditions within the apparatus to optimize the environment for growing plants therein.

Figure 1:
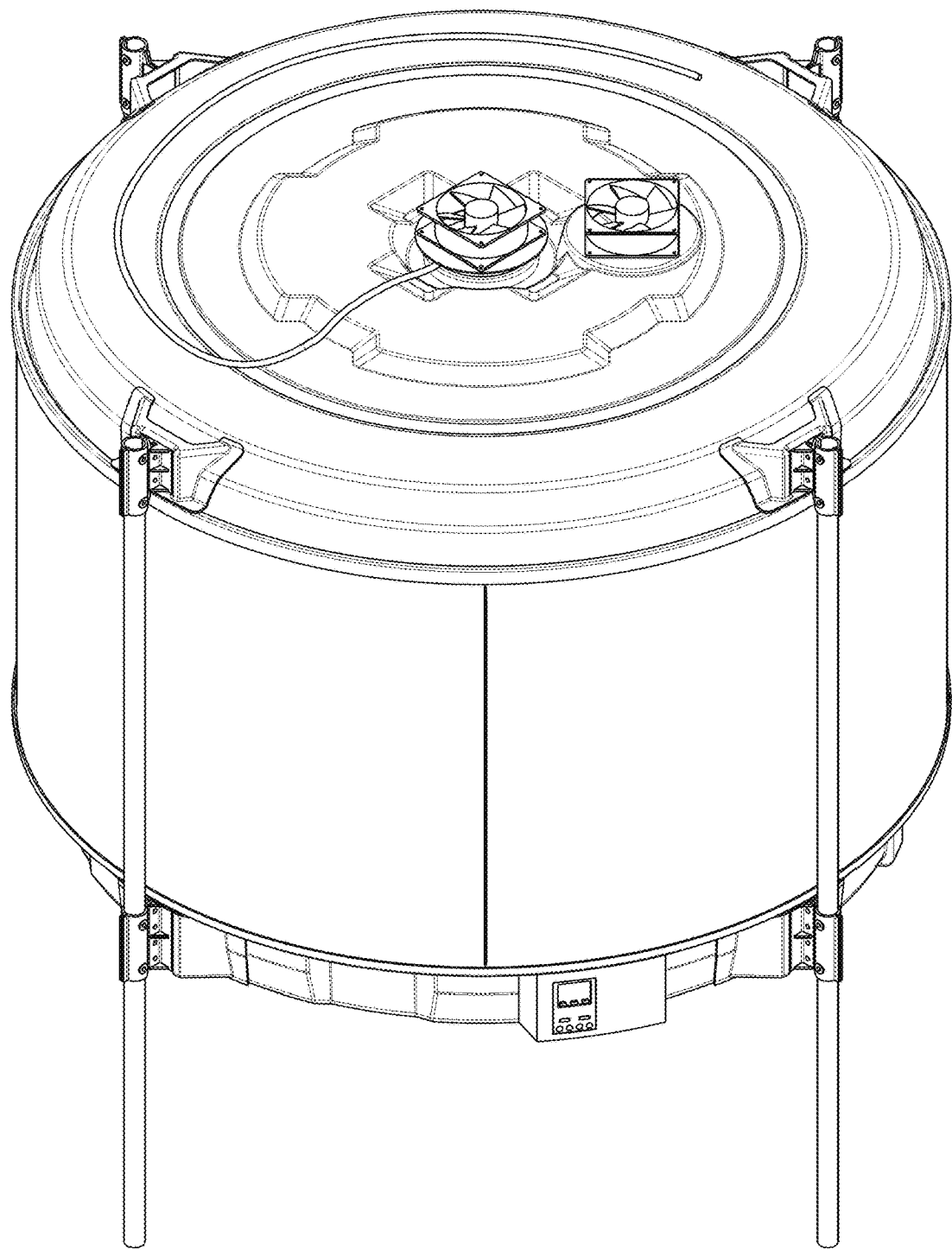
FIG. 1 shows an apparatus for growing plants, in accordance with an exemplary embodiment of the present disclosure.
Figure 2:
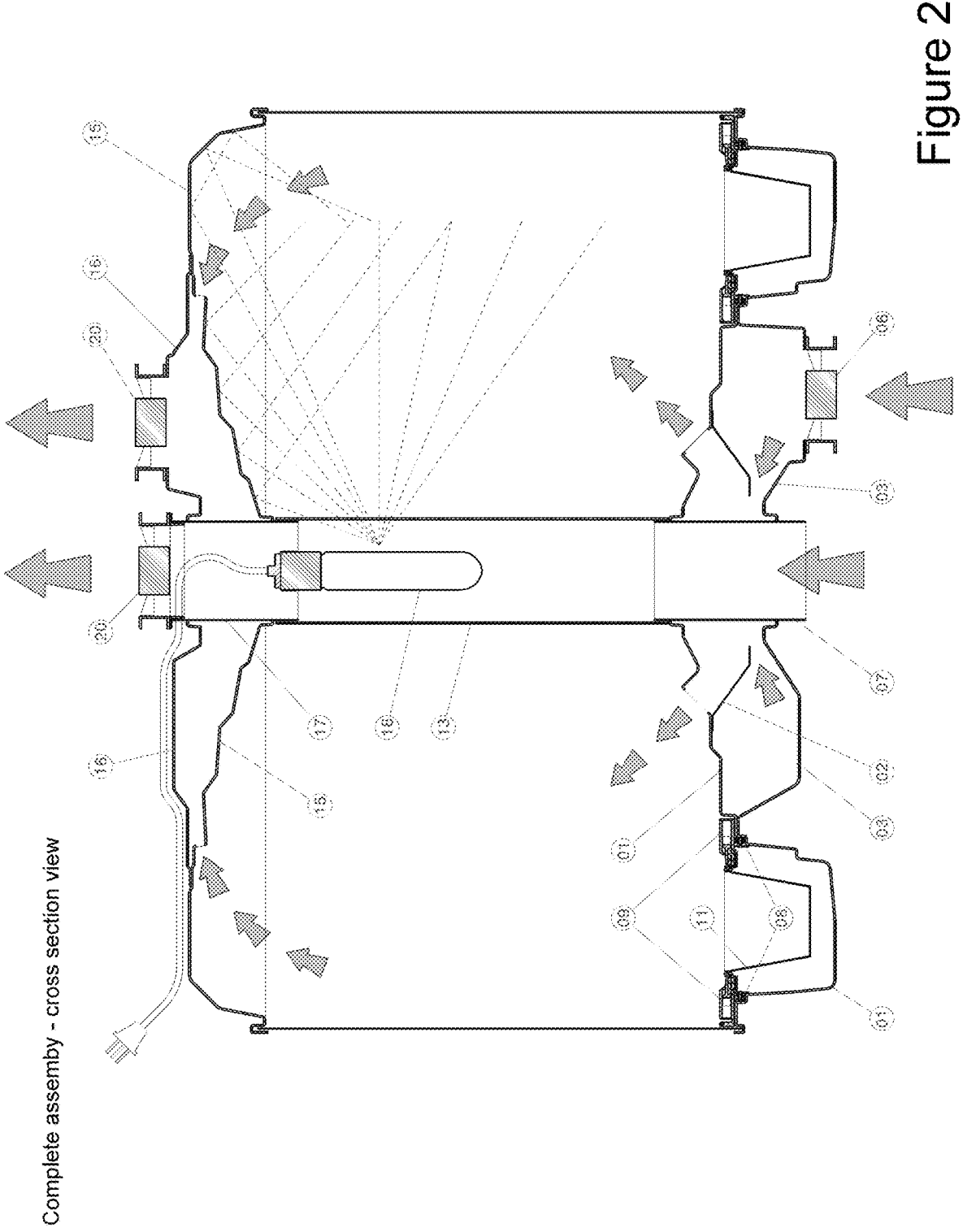
FIG. 2 shows a cutaway view of an apparatus for growing plants, in accordance with an exemplary embodiment of the present disclosure.
Figure 3:
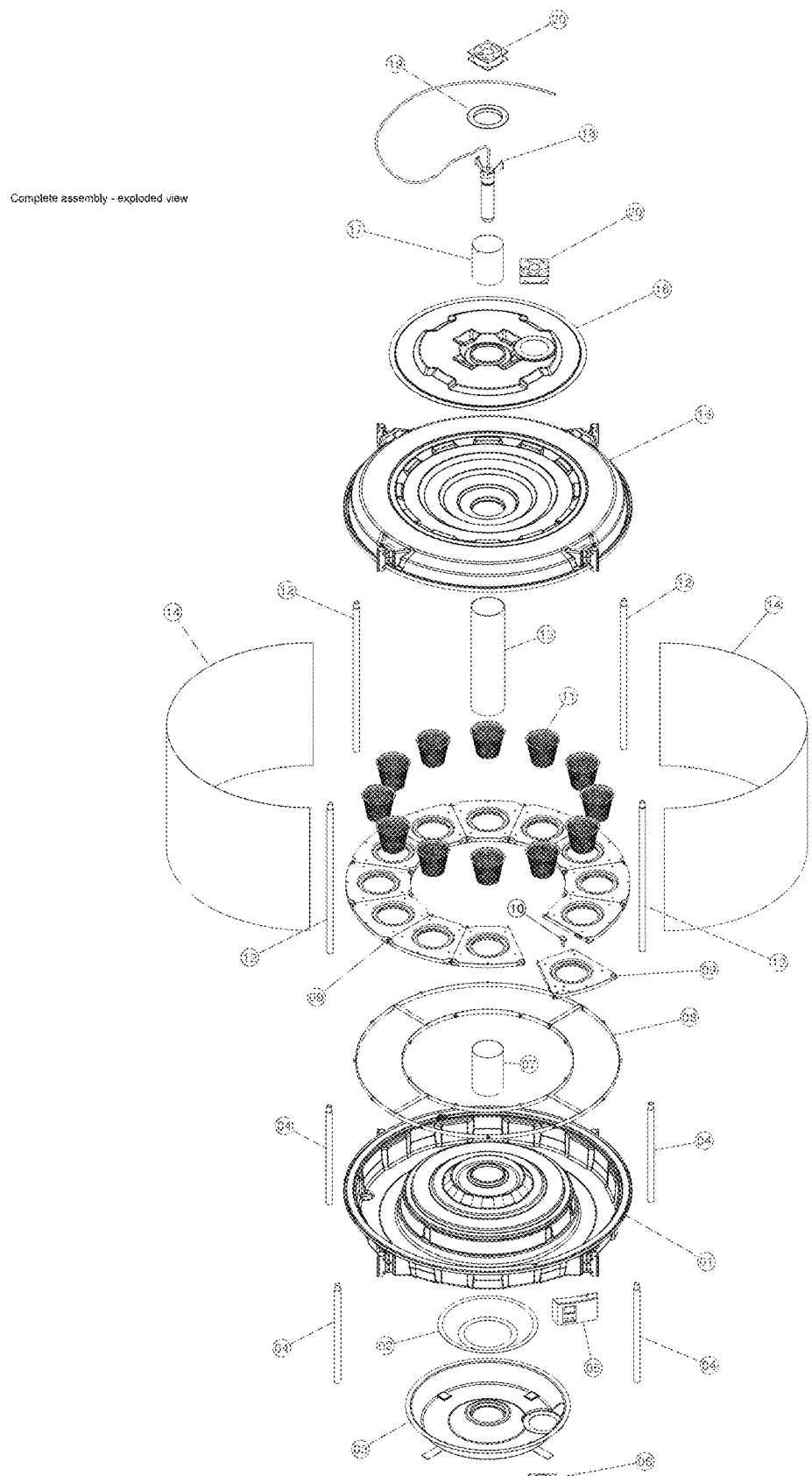
FIG. 3 shows an exploded view of an apparatus for growing plants, in accordance with an exemplary embodiment of the present disclosure.

Referring FIGS. 1, 2, and 3, in an embodiment, the apparatus 1000 includes a trough 01, a conical baffle 02, a bottom closure 03, at least one lower vertical support 04 (also referred to herein as a "leg"), a motor and controller sub-assembly 05, an axial intake fan 06, a cylindrical air intake sleeve 07, a rolling track 08 (which track may be of a dual concentric configuration, and a cassette. The cassette may be motorized 09M or standard 09. The apparatus preferably further comprises a drive pinion key 10, at least one pair of baskets 11, at least one upper vertical support 12, a glass tube 13, at least one sliding door panel 14, a lid (or cover) 15, a lid closure 16, an exhaust sleeve 17, a lamp and socket arrangement 18, a fan adapter 19, and a fan 20.

For forming the base of the apparatus and as shown in an exemplary embodiment in FIGS. 16, 17, 18 and 19, a trough sub-assembly is provided, which trough sub-assembly comprises a trough 01-T, a conical baffle 02-T, a bottom closure 03-T, an air intake sleeve 04-T, and an intake fan 05-T.

The lower vertical support may comprise a swaged portion at the end of the support that is proximate to the trough, to which the lower vertical support attaches and supports. The upper vertical support attaches to the end of the lower vertical support that is proximate to the trough, and particularly, to the swaged portion of the lower vertical support. The upper vertical support may also comprise a swaged portion, which swaged portion is distal to the swaged portion of the lower vertical support. The upper vertical support can receive and support the lid of the apparatus. The vertical supports are preferably exterior to the enclosure in which plants are grown such that the vertical supports do not physically interfere with the growing of plants in the enclosure. Additional lower vertical supports can thereafter be place on top of a first set of upper vertical supports after a first apparatus is assembled, to allow stacking of multiple apparatuses on one another.

In an embodiment, the trough is configured to receive baskets in which plant material may be disposed for the growing process. The trough comprises at least one bracket against which a lower vertical support may be disposed to support the trough, and preferably the trough comprises a plurality of such brackets, each of which being disposed against a lower vertical support of a plurality of lower vertical supports. The trough preferably further comprises at least one sump for drainage and at least one intake aperture. A ledge on at least a portion of the interior circumference of the trough may provide support for irrigating components (i.e., nutrient delivery components) and/or aeroponic or hydroponic components, for example. On the side of the trough that is disposed away from the enclosure, a baffle and a closure panel may be provided and which may accommodate an intake fan to create a positive air pressure plenum or cavity. Air may be forced into the plenum, deflected by the baffle, and directed through openings in the trough onto plants that are growing in the enclosure of the apparatus.

In an embodiment, a central intake sleeve or duct passes through the enclosure of the apparatus and the trough, which sleeve or duct forms a separate air passageway through the enclosure. The sleeve or duct therefore allows the trough to accommodate two separate airflows through the chamber. FIG. 2 shows exemplary airflow paths in and out of the apparatus.

Additional circumferential ledges may be provided on the trough. In an embodiment, corresponding ledges that are on the interior and exterior circumference are provided and configured to accept tracks, which tracks include wheels that bear upon the ledges and permit the tracks to rotate around the trough. Further, a dedicated groove or track is provided within the trough to receive sliding doors of the apparatus and to allow such doors to slide open and closed.

Figure 4:
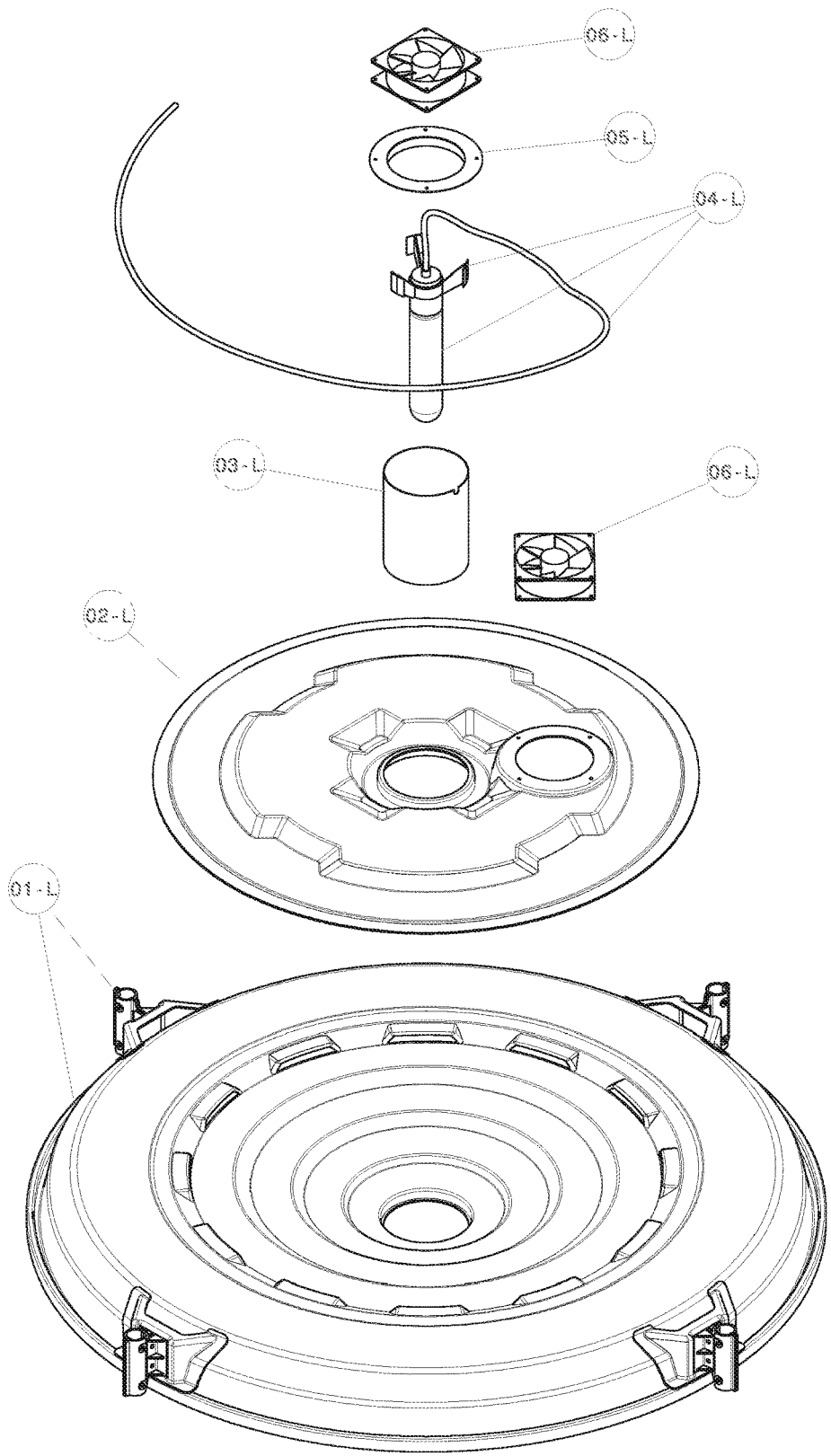
FIG. 4 shows a lid assembly of an apparatus for growing plants, in accordance with an exemplary embodiment of the present disclosure.
Figure 5:
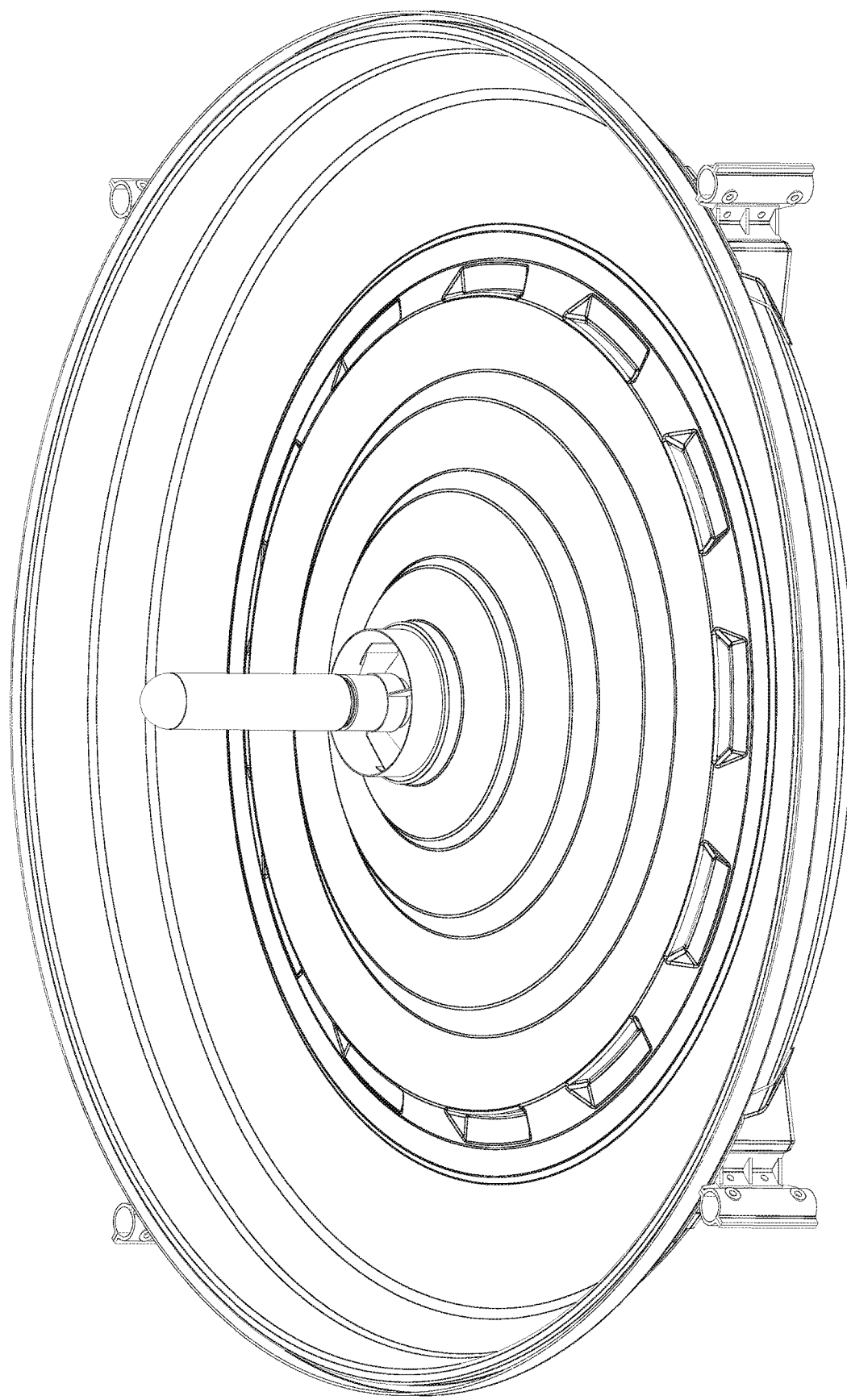
FIG. 5 shows another view of a lid assembly of an apparatus for growing plants, in accordance with an exemplary embodiment of the present disclosure.
Figure 6:
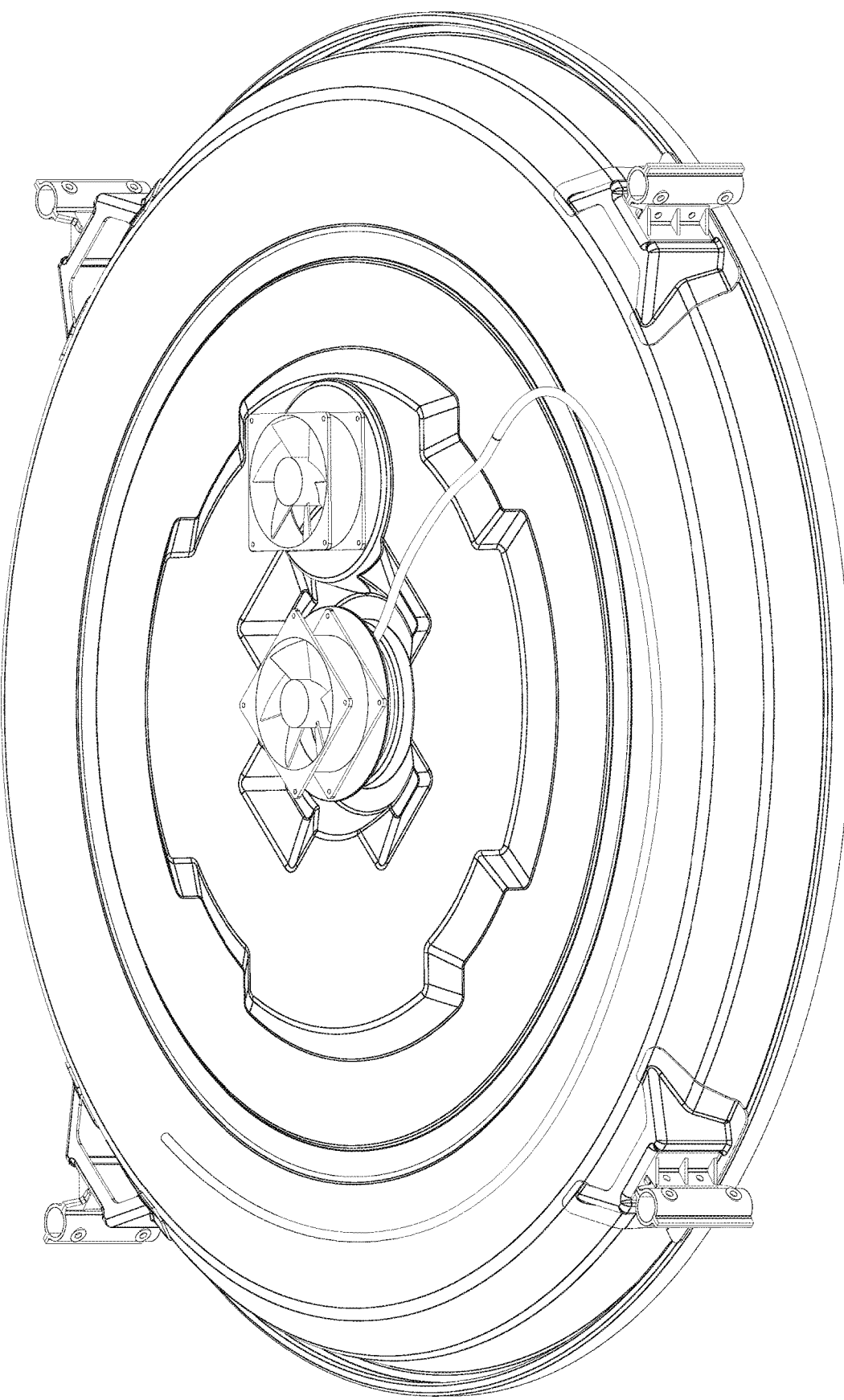
FIG. 6 shows yet another view of a lid assembly of an apparatus for growing plants, in accordance with an exemplary embodiment of the present disclosure.

In an embodiment and as shown in FIGS. 4, 5 and 6, a lid sub-assembly of the apparatus comprises a lid (or cover) 01-L, a lid closure 02-L, an exhaust sleeve 03-L, a lamp and socket and basket sub-assembly 04-L, a fan adapter 05-L, and an exhaust 06-L. The lid also may comprise at least one bracket, and in an embodiment, a plurality of brackets, with the number of brackets corresponding to the number of brackets of the trough. The brackets of the lid may receive upper support brackets for assembling the apparatus. The surface of the lid that is interior to the enclosure may comprise a reflective surface for reflecting light from a light source onto the plants that are growing in the enclosure. The surface of the lid that is interior to the enclosure may comprise a radial pattern of slots, which slots may correspond to the position or location of a plant or plants that is or are being grown in the apparatus for providing uniform airflow over each plant within the enclosure. The closure of the lid comprises, in an embodiment, a closure panel, which closure panel can accommodate an exhaust fan that may create negative air pressure. The lid may also accommodate the sleeve or duct that passes through the enclosure of the apparatus, such that the lid may accommodate two separate airflows through the enclosure. The exhaust fan may be disposed at the end of the sleeve or duct that is proximate to the lid, and the sleeve or duct itself may support and house a lighting fixture for lighting the enclosure of the apparatus. A tube may encircle the portion of the sleeve or duct that projects into the enclosure to create a sealed connection between the sleeve or duct and the lid (and with the trough). Similar to the trough, a dedicated groove or track may be provided within the lid to receive sliding doors of the apparatus and to allow such doors to slide open and closed.

In another embodiment, the lid comprises a plurality of duct shrouds, and a plurality of ducts corresponding to each shroud. The ducts comprise airflow paths through the enclosure. Exhaust fans are preferably disposed at the end of each duct shrouds that is distal to the interior of the enclosure, and the fans are further preferably mounted in a vertical configuration on the lid. Such mounting configuration allows for substantially uninterrupted airflow, such as when one apparatus is stacked on another, and further reduces the infiltration of unwanted light into the enclosure.

The at least one pair of baskets 09-CS (shown in FIG. 13, in an exemplary embodiment) of the apparatus may comprise a mesh basket that allows air and other nutrients or nutrient fluid to be communicated to plants that are disposed in the baskets. As will be discussed elsewhere herein, the baskets are operatively coupled to a spur or ring gear of the drive mechanism such that the baskets may rotate for idealized exposure of the plant to growing conditions of the controlled environment of the system disclosed herein. In coupling the baskets to a spur or ring gear of the drive mechanism, the apparatus does not require that the baskets be borne by the trough. Furthermore, in the embodiment described herein, the baskets are not dependently coupled to one another, which means that one or more baskets of the system can be removed from the enclosure without affecting performance of the apparatus.

Figure 13:
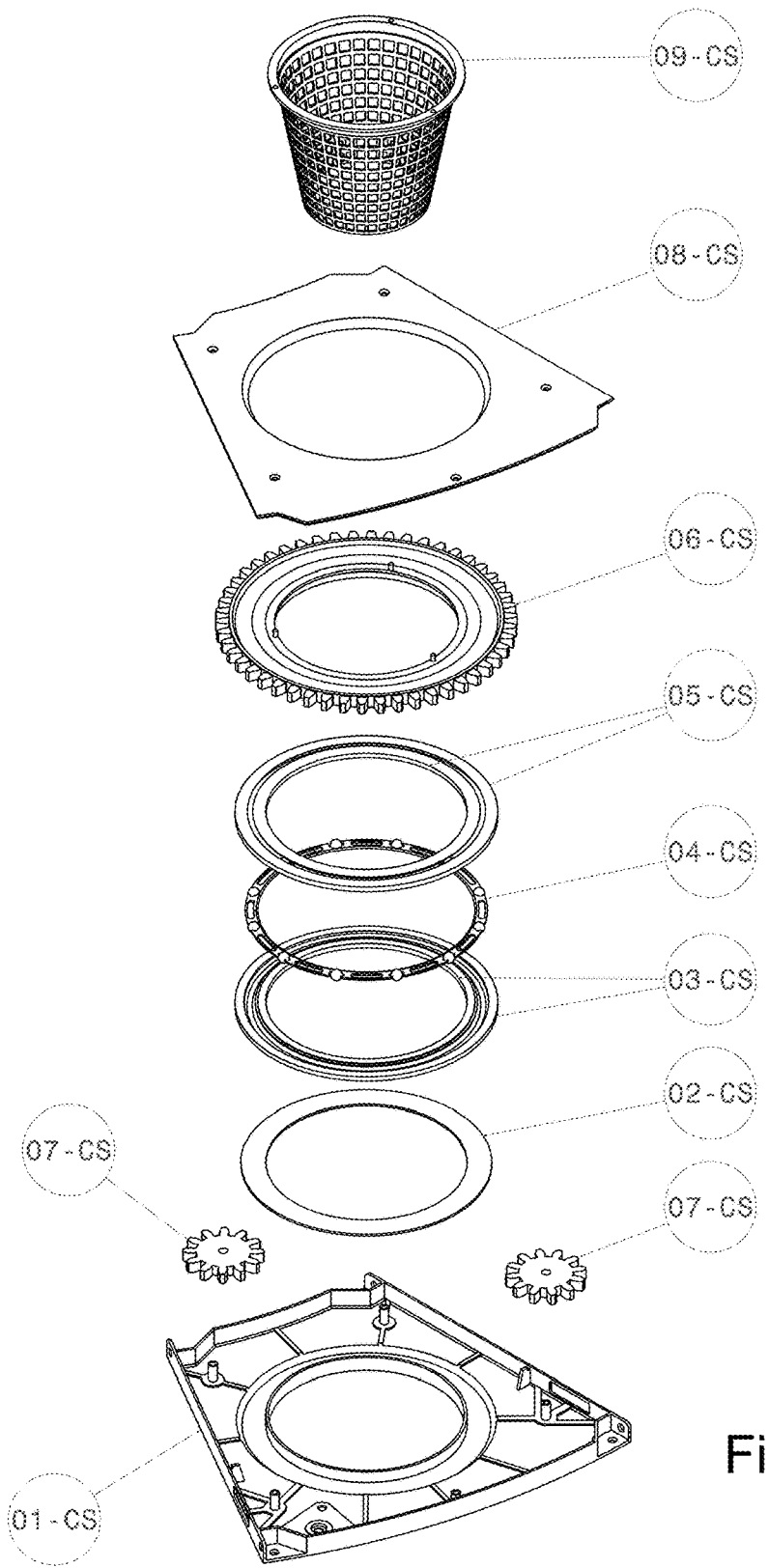
FIG. 13 shows another view of an cassette and basket of an apparatus for growing plants, in a accordance with another exemplary embodiment of the present disclosure.
Figure 14:
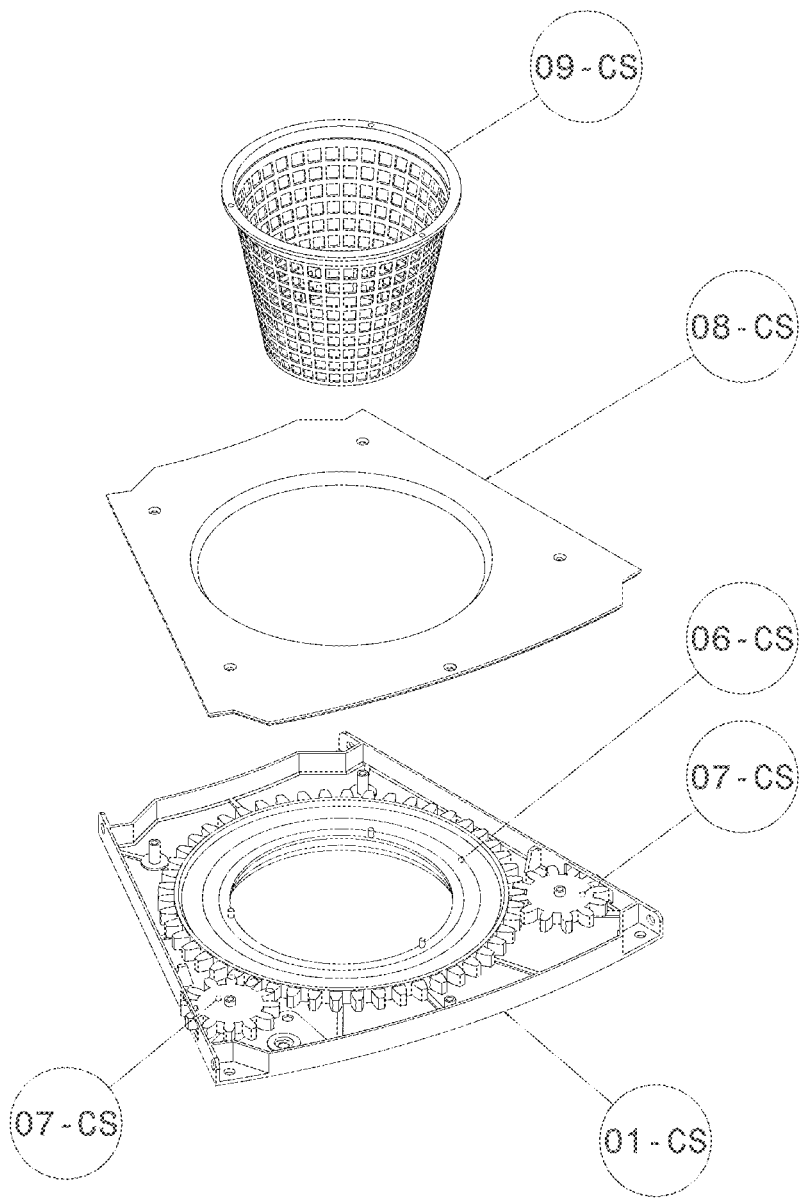
FIG. 14 shows another view of an cassette and basket of an apparatus for growing plants, in a accordance with another exemplary embodiment of the present disclosure.
Figure 15:
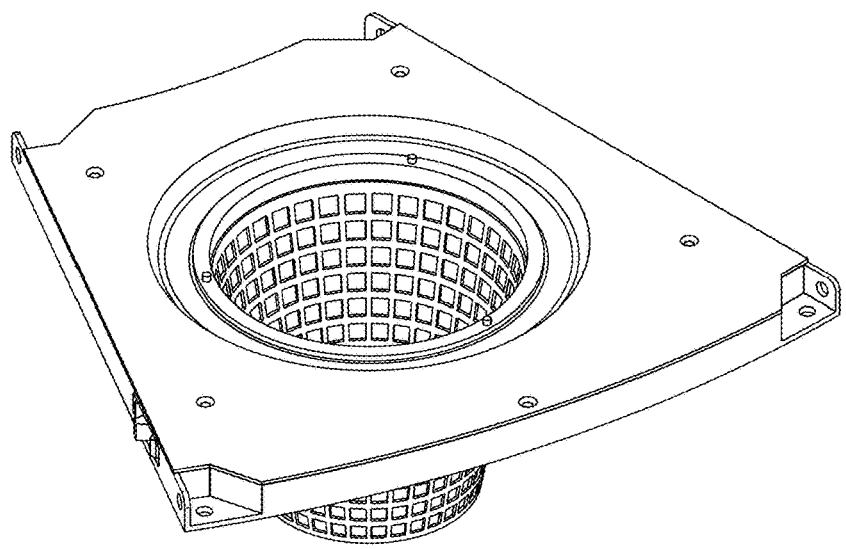
FIG. 15 shows another view of an cassette and basket of an apparatus for growing plants, in a accordance with another exemplary embodiment of the present disclosure.
Figure 15:
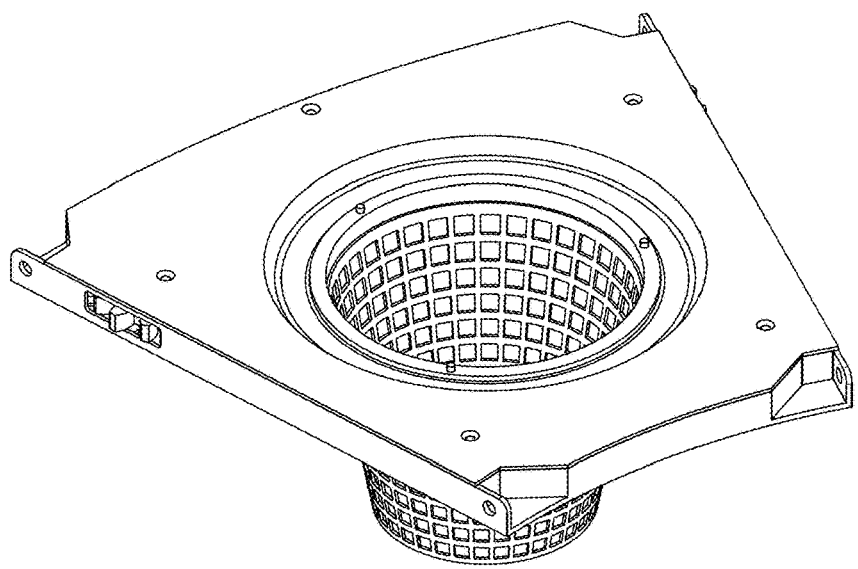
Figure 16:
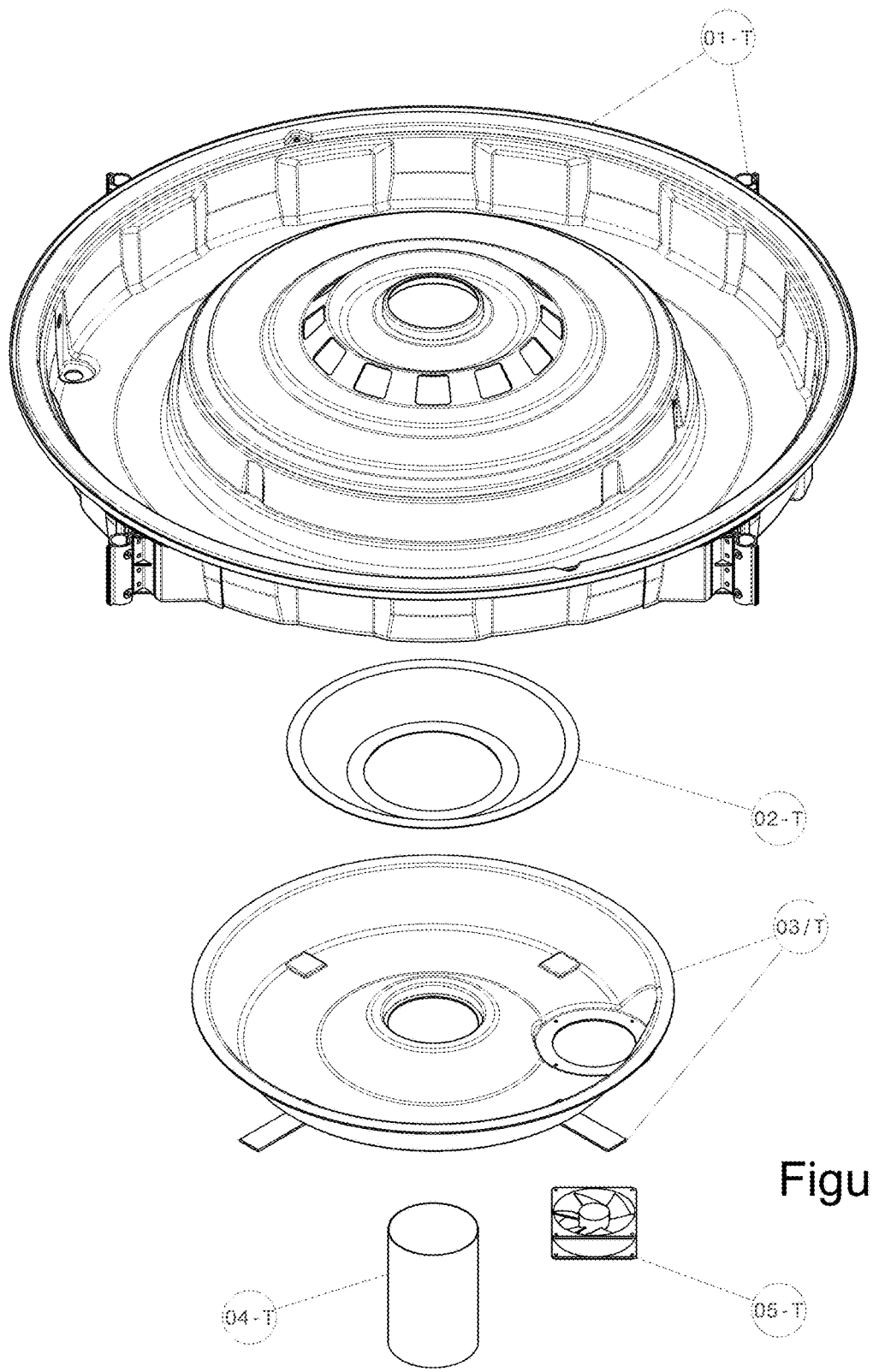
FIG. 16 shows a trough assembly of an apparatus for growing plants, in accordance with an exemplary embodiment of the present disclosure.
Figure 17:
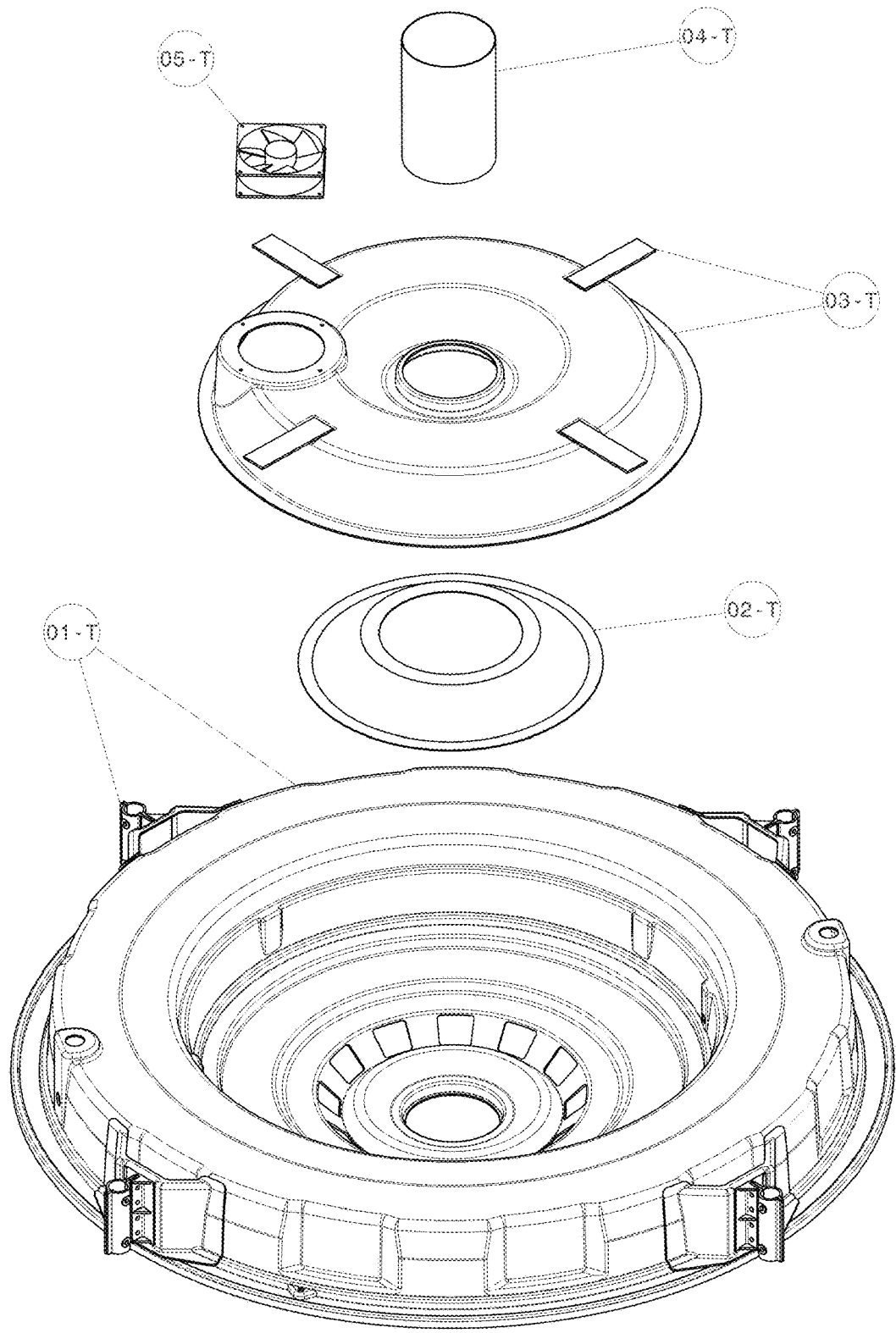
FIG. 17 shows another view of a trough assembly of an apparatus for growing plants, in accordance with an exemplary embodiment of the present disclosure.
Figure 18:
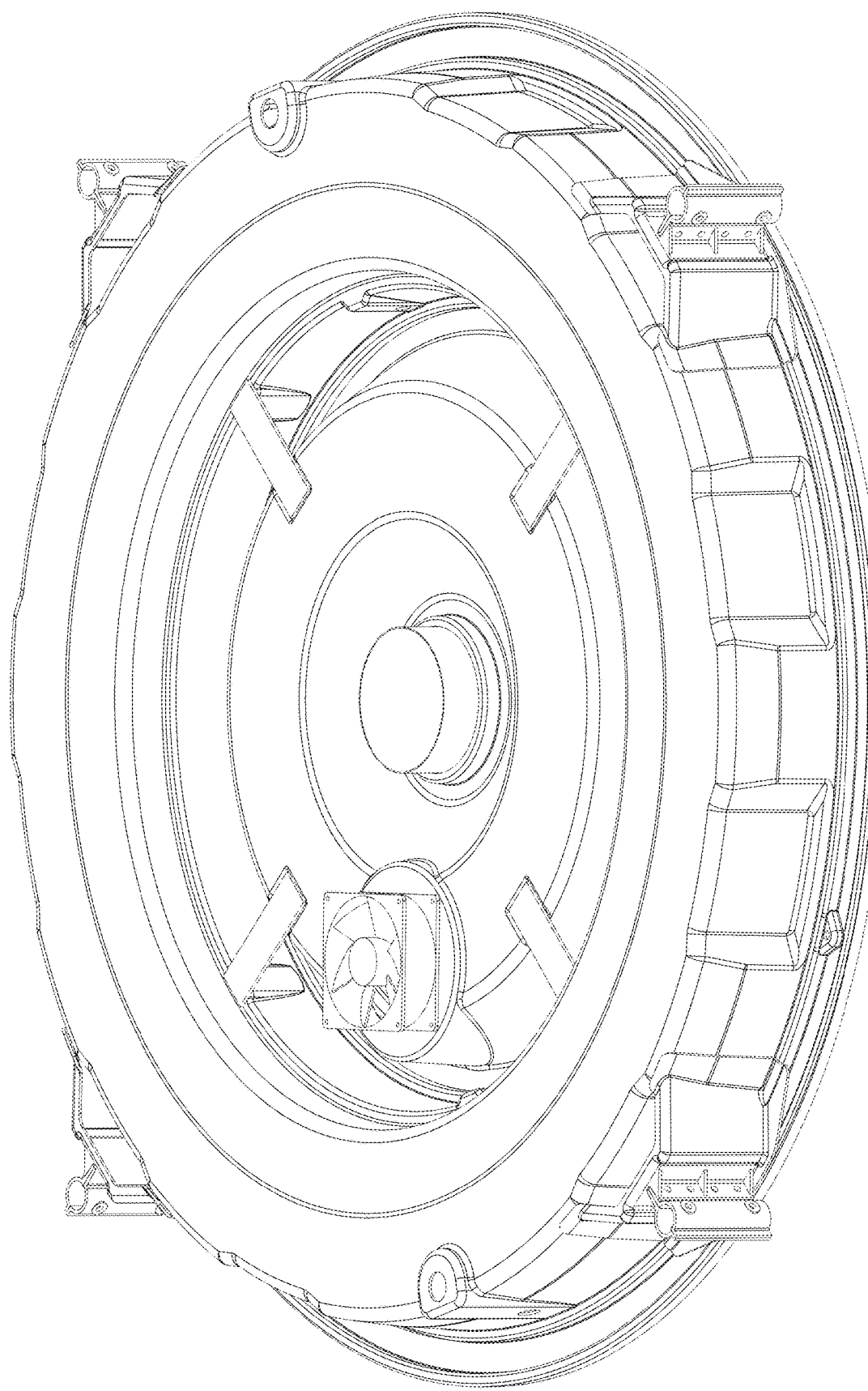
FIG. 18 shows another view of a trough assembly of an apparatus for growing plants, in accordance with an exemplary embodiment of the present disclosure.
Figure 19:
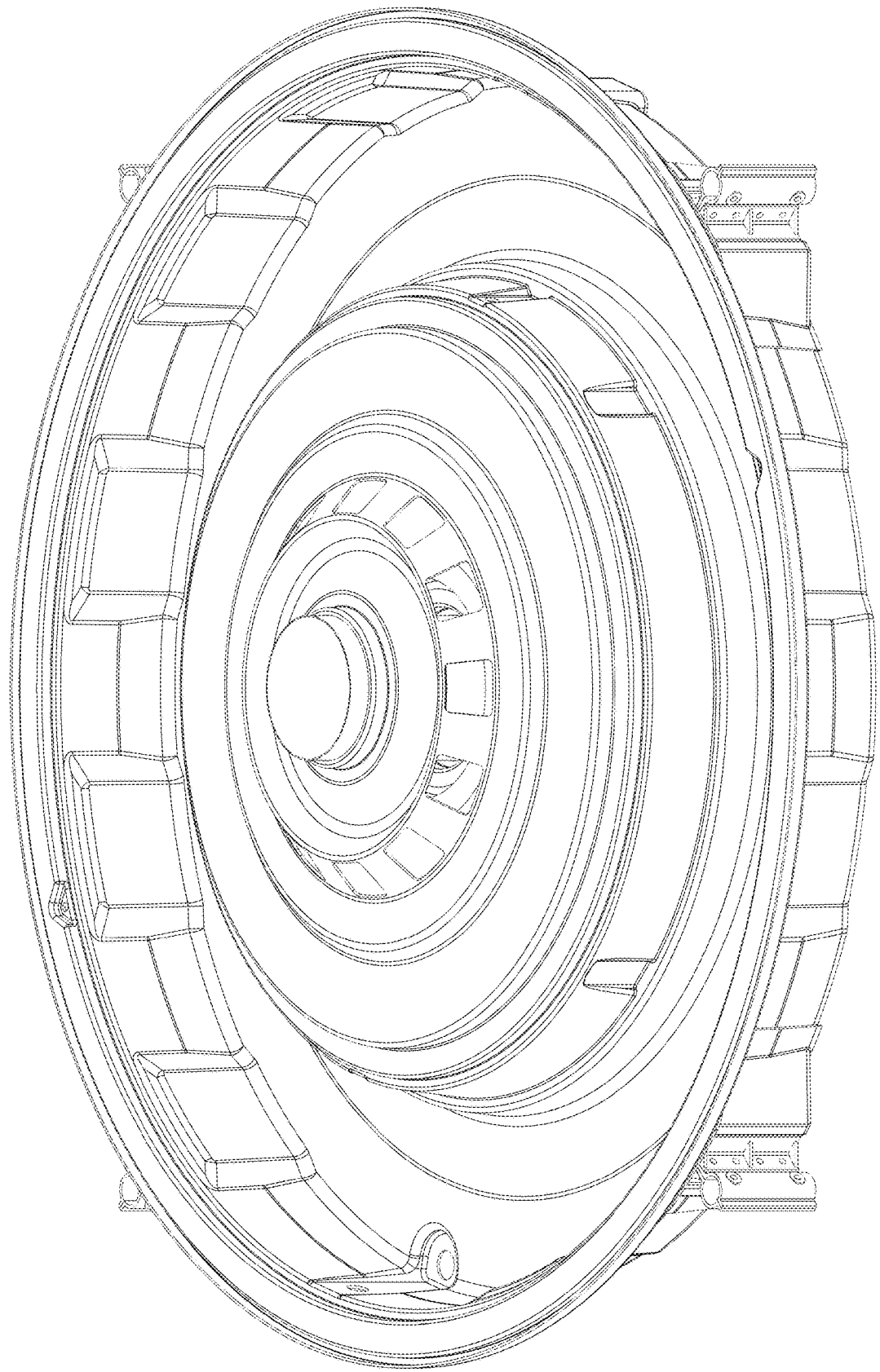
FIG. 19 shows yet another view of a trough assembly of an apparatus for growing plants, in accordance with an exemplary embodiment of the present disclosure.
Figure 20:
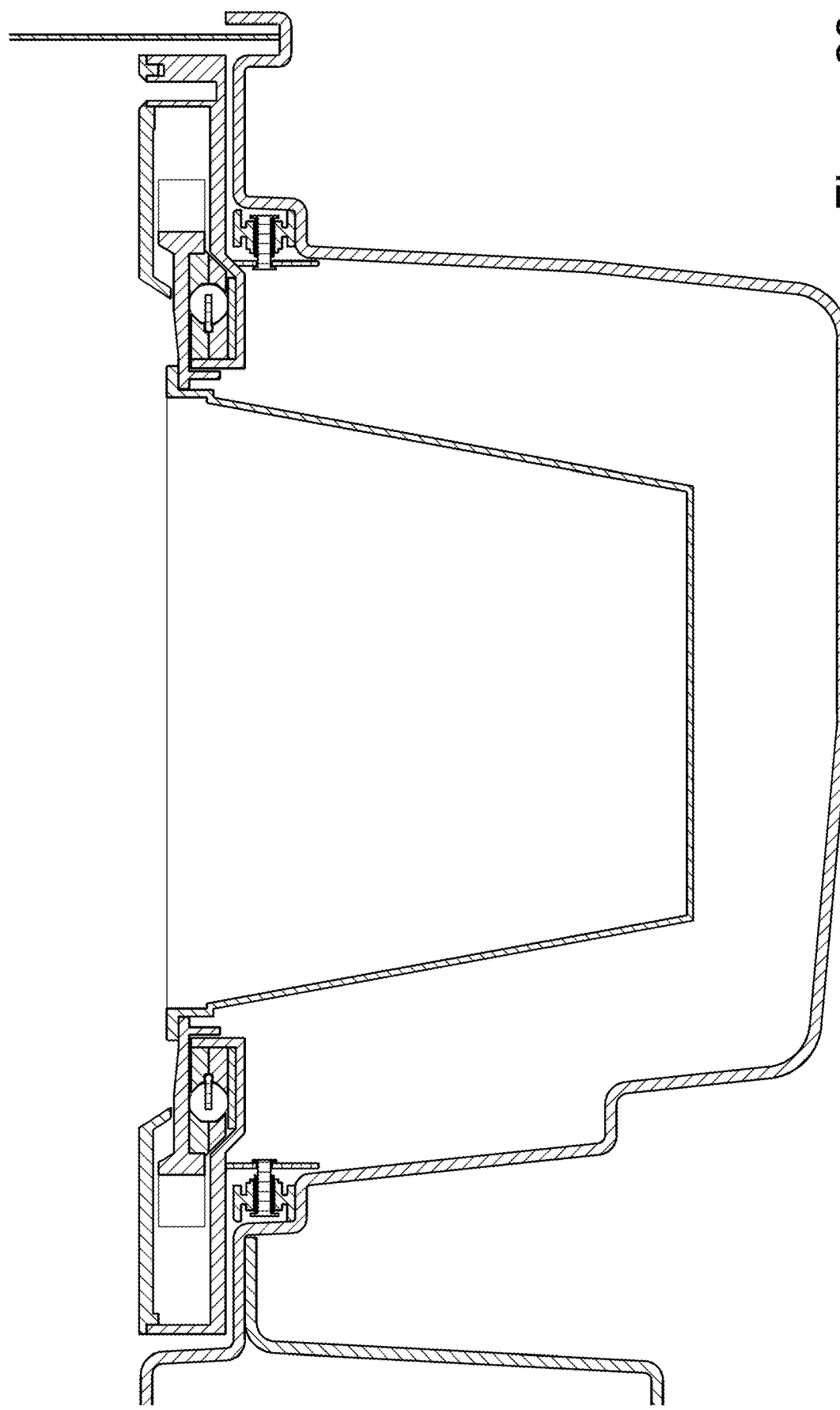
FIG. 20 shows a cutaway view of a track of a growing apparatus, in accordance with an exemplary embodiment of the present disclosure.

The apparatus further comprises a drive mechanism for rotating plant baskets as part of the growing process. The drive mechanism comprises a at least one cassette, and preferably, a plurality of cassettes, that are arranged, in an embodiment, in a circumferential configuration. An exemplary tray of cassettes is shown in FIGS. 13 and 14 as element 01-CS. Each cassette is preferably disposed adjacent to another cassette to allow rotational motion of one cassette to translate to an adjacent cassette. In a preferred embodiment and to obtain synchronous motion, the number of cassettes is a multiple of two. One of the cassettes is a may be motor-driven unit, which driven unit may translate motion to the remainder of (standard) cassettes. Plant baskets are received within the cassettes and are individually rotated by the cassettes.

In an embodiment, a standard cassette comprises a cassette tray 01-CS, a bearing plate 02-CS, a lower grooved track 03-CS, a ball bearing and cage 04-CS, an upper grooved track 05-CS, a gear ring 06-CS (and, in an embodiment, a 50-tooth spur gear ring), a gear 07-CS (and, in an embodiment, a 12-tooth idler gear), a cover 08-CS, and a basket 09-CS. The cassettes may be individually removable to allow access to the trough during operation of the apparatus. The cassettes preferably do not bear directly on the trough and are not fixed on the trough. Rather, they preferably sit on concentric rolling tracks that permit the cassettes to be moved circumferentially within the enclosure of the apparatus. This movement increases ease of access to plants even if the enclosure is openable only at one point, which permits the apparatus to be placed in close proximity to walls and/or other apparatuses if space is limited.

Figure 7:
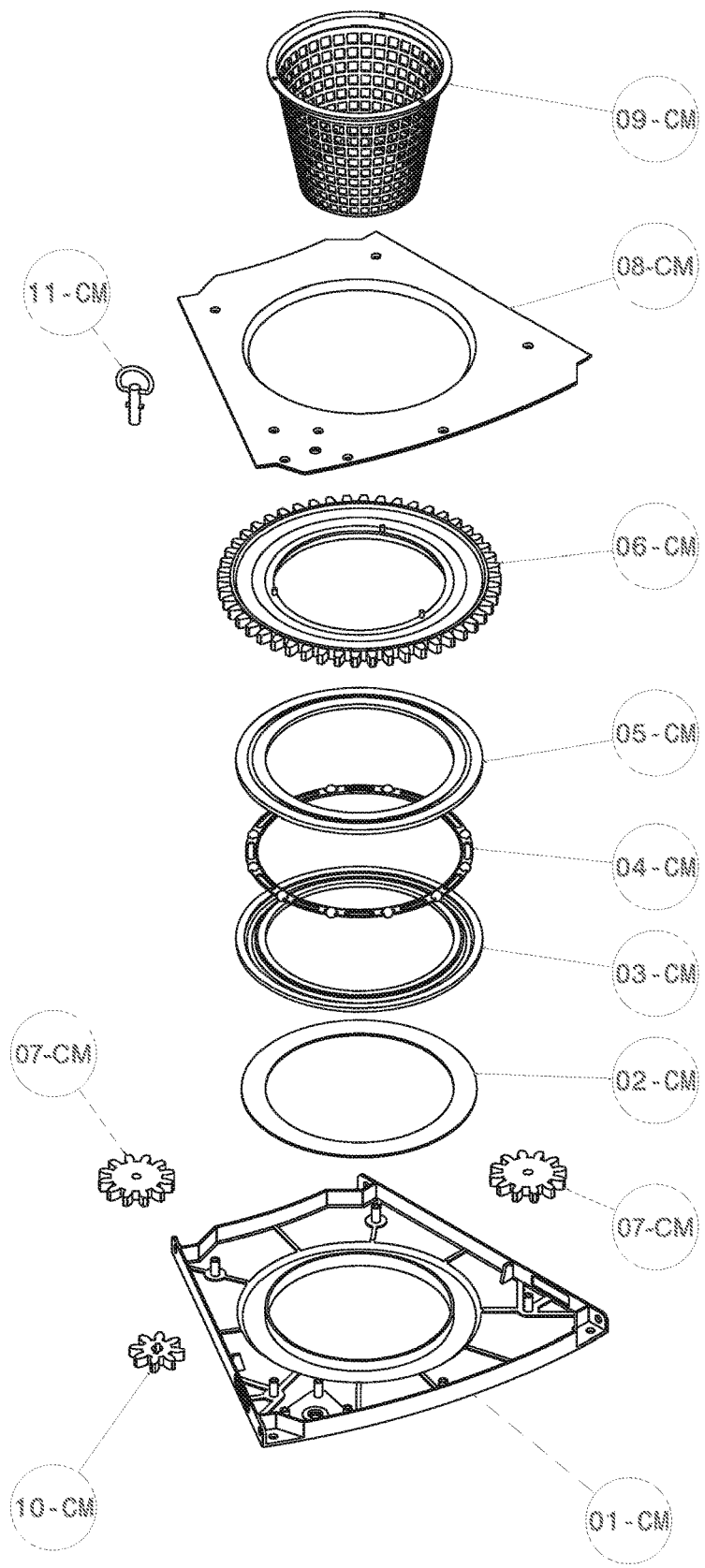
FIG. 7 shows a cassette and basket of an apparatus for growing plants, in a accordance with an exemplary embodiment of the present disclosure.
Figure 8:
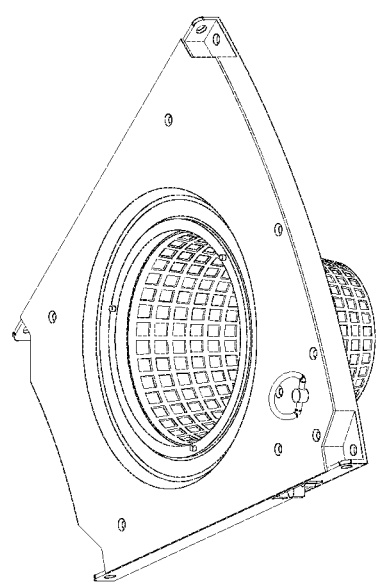
FIG. 8 shows another view of an cassette and basket of an apparatus for growing plants, in a accordance with another exemplary embodiment of the present disclosure.
Figure 9:
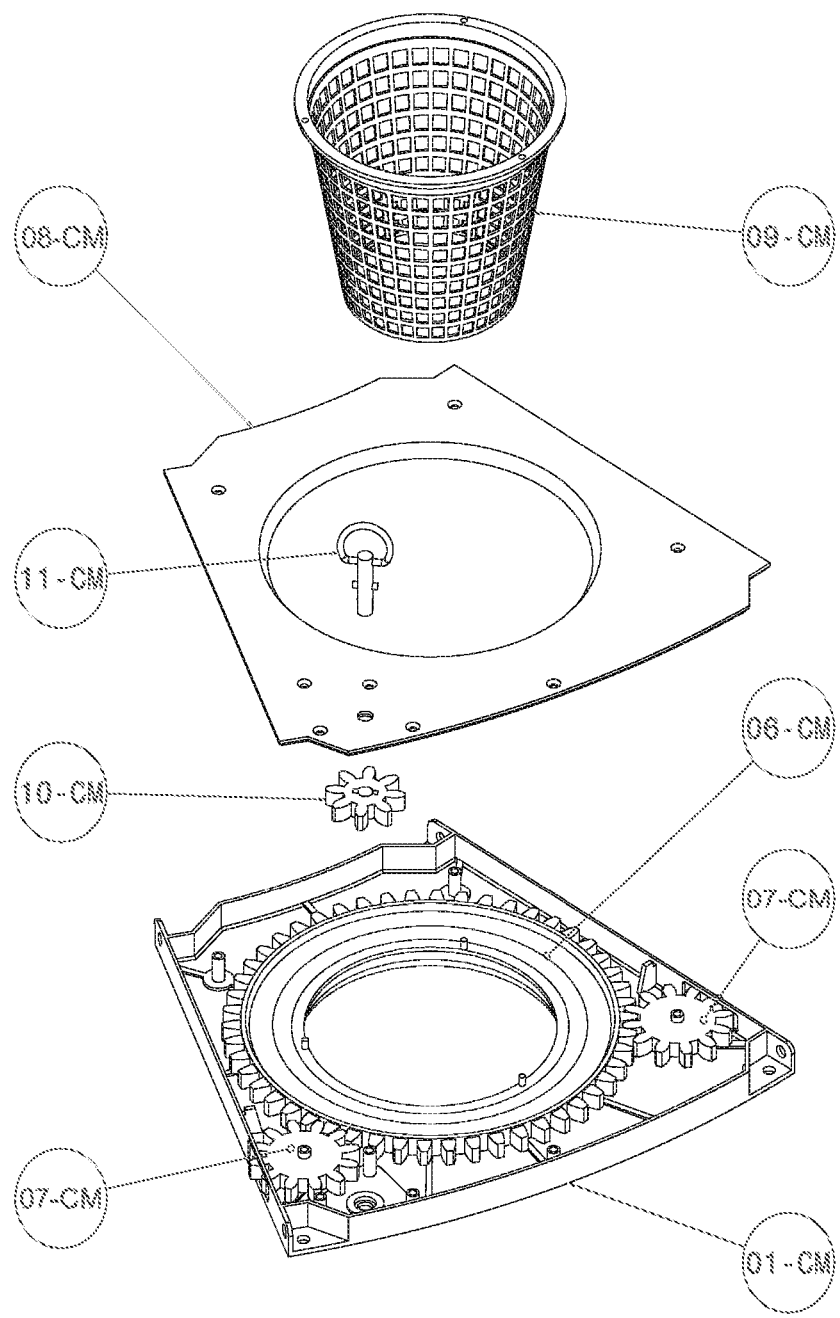
FIG. 9 shows another view of an cassette and basket of an apparatus for growing plants, in a accordance with another exemplary embodiment of the present disclosure.

In an embodiment and as shown in FIGS. 7, 8 and 9, the motor-driven cassette comprises a cassette tray 01-CM, a bearing place 02-CM, a lower grooved track 03-CM, a ball bearing and cage 04-CM, an upper grooved track 05-CM, a gear ring 06-CM (and, in an embodiment, a 50-tooth spur gear ring), a gear 07-CM (and, in an embodiment, a 12-tooth idler gear), a cover 08-CM, a basket 09-CM, a drive pinion 10-CM, and a pinion lock key 11-CM. The drive pinion preferably comprises an 8-tooth drive pinion with keyway and is in any event removable. The drive pinion comprises a slotted keyway such that the keyed shaft or pin may be pushed down through the drive pinion and engage with a tabbed shaft that projects from and/or through the trough. The shaft is operatively coupled to a servo or stepper motor. The motor, when engaged with the drive pinion via the shaft or pin drives all cassettes simultaneously.

If the keyed shaft/pin is disengaged from the slotted shaft, the entire cassette assembly is decoupled from the motor and can be moved, operated and turned manually. In such instance, the cassette assembly is also "unpinned" from the trough and can be freely rotated in the apparatus along the concentric rolling tracks.

Figure 21:
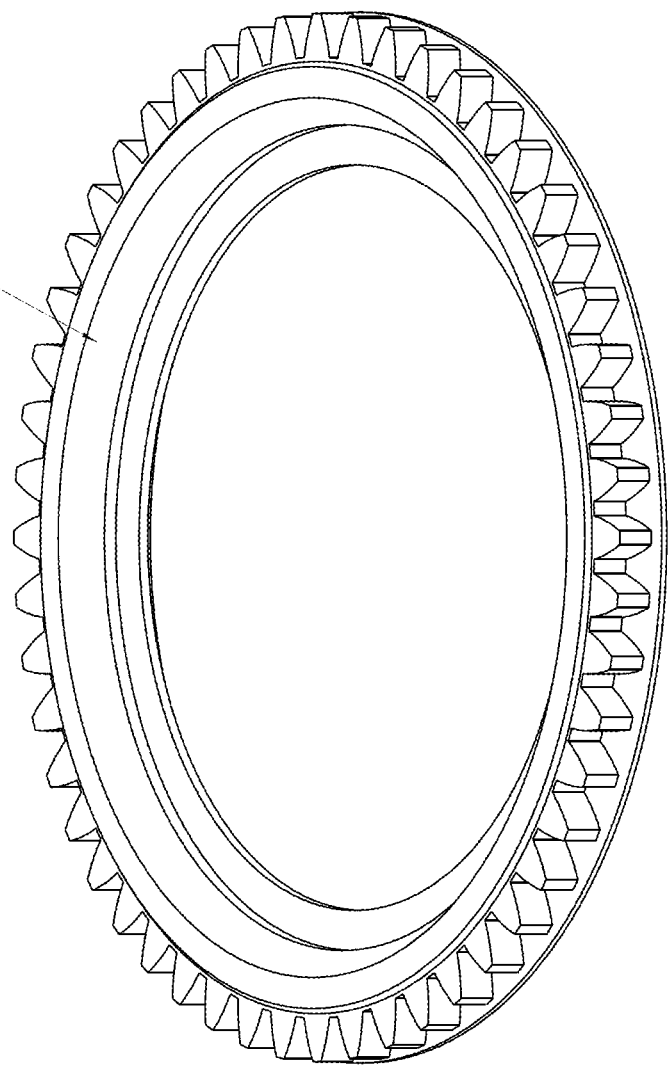
FIGS. 21 and 22 show a bearing and gear and components associated therewith, in accordance with an exemplary embodiment of the present disclosure.
Figure 22:
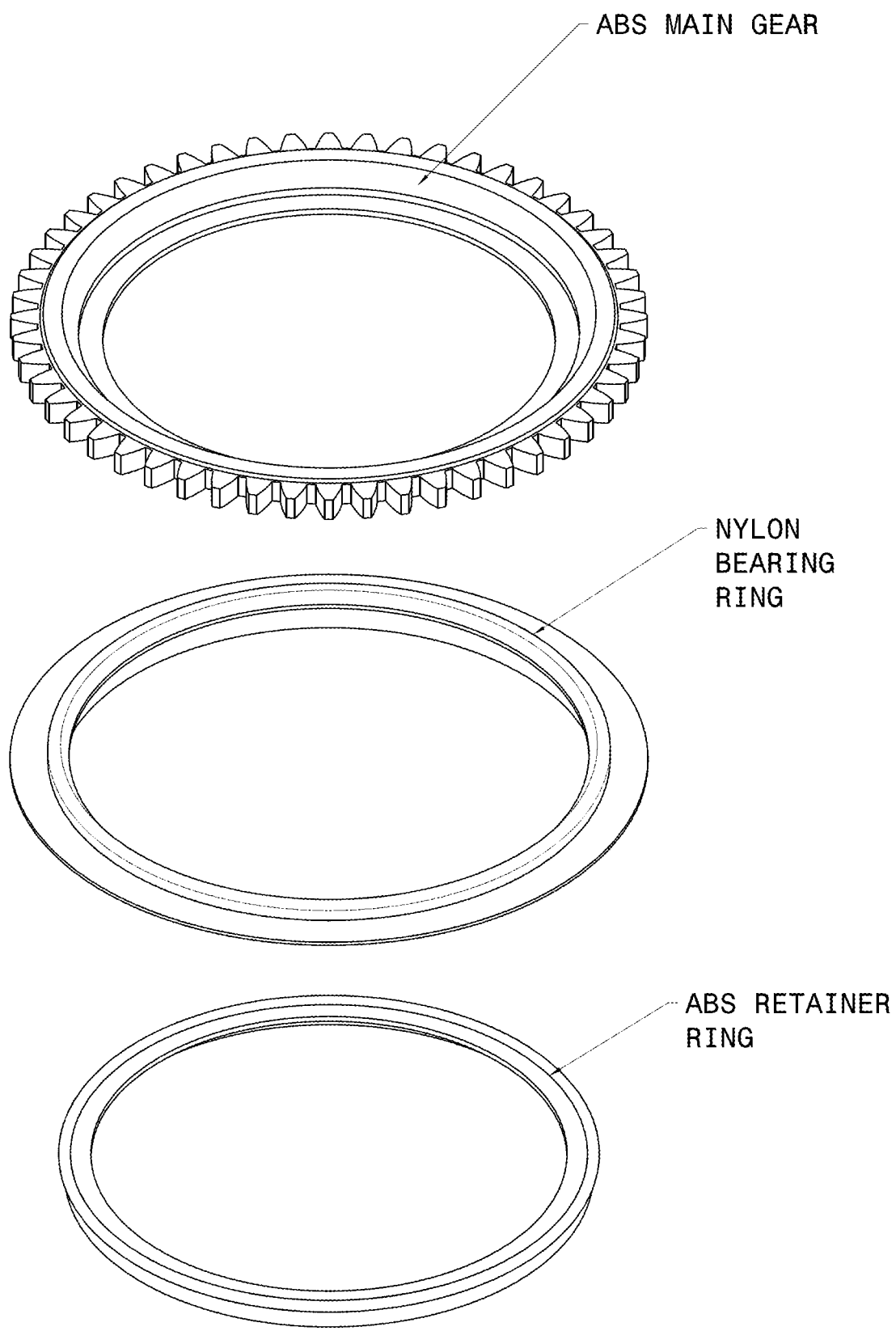

Each cassette comprises a main spur or ring gear, which gear is preferably attached to a bearing assembly that is fixed to the bottom of the cassette. The bearing assembly is configured to support both axial and radial loads and facilitates rotation of the plants and accommodates the weight of the plants and any lateral loads that result from rotational motion of a plant basket. Advantageously, substantially all loads imposed on the apparatus (due to gravity and rotational forces) are supported by the cassettes. In an embodiment and as shown in FIGS. 21 and 22, the bearing assembly comprises a single monolithic bearing ring that supports the gear and a single retaining ring at the underside of the gear. This configuration reduces the possibility that the gear may lift up while under load.

Each cassette preferably comprises at least one idler gear, and in an embodiment, an idler gear on each side of the cassette. The idler gears mesh with the main spur/rig and project from the side of each cassette through a slotted opening. When cassettes are placed adjacent to each other, the slotted openings of adjacent cassettes are aligned and the idler gears of one cassette mesh with the idler gears of an adjacent cassette. The cassettes may be joined to one another by mechanical fasteners when in operation.

Figure 23:
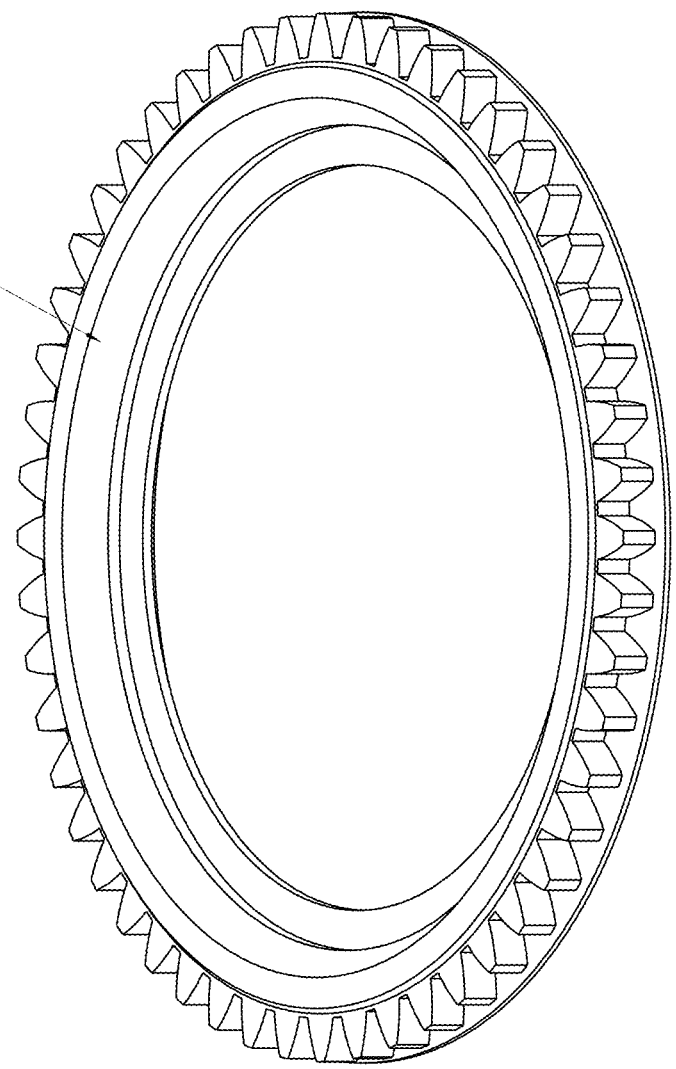
FIGS. 23 and 24 show a cassette of an apparatus for growing plants, in accordance with an exemplary embodiment of the present disclosure.
Figure 24:
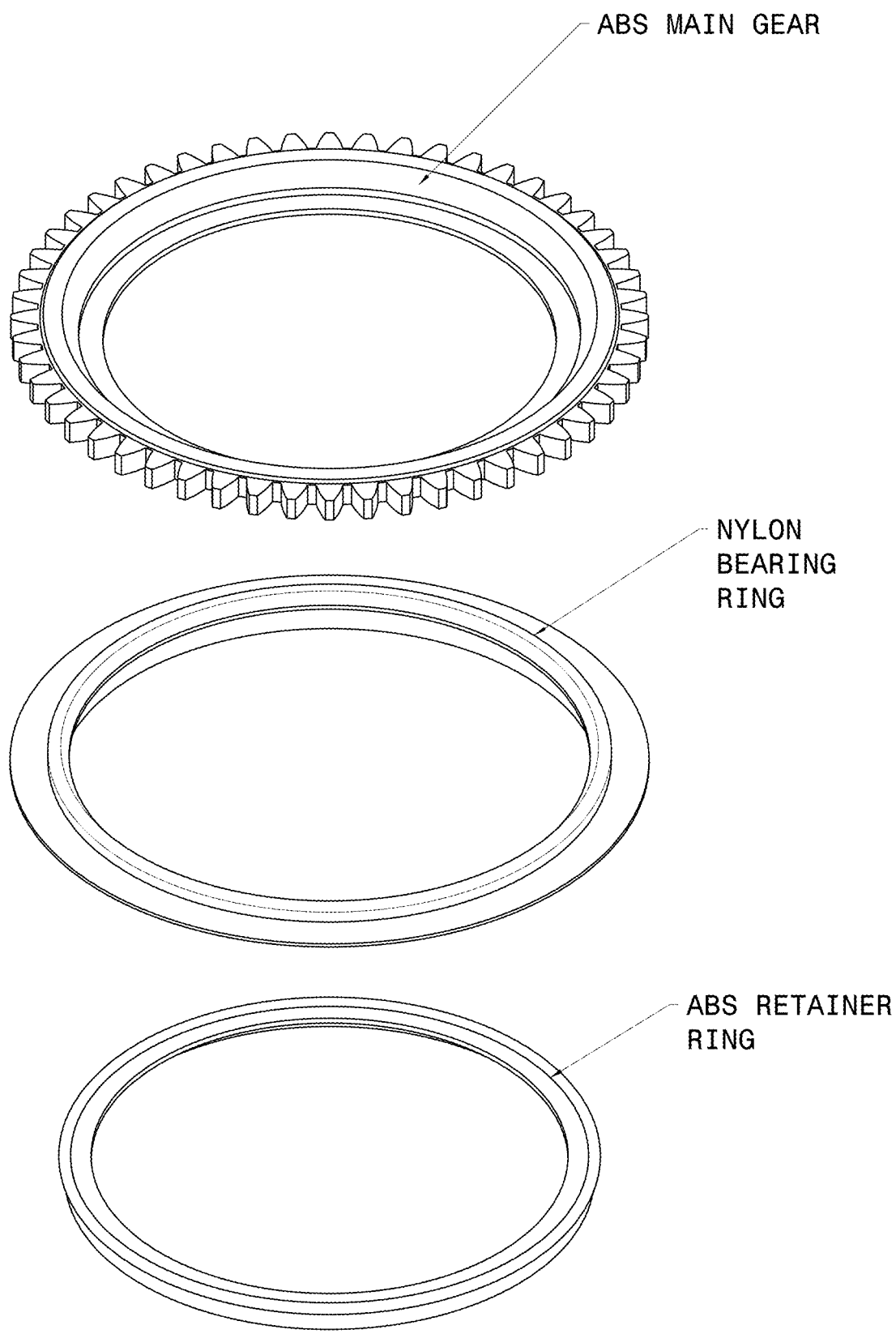

In an embodiment, and as shown in FIGS. 23 and 24, a cassette comprises, a plurality of bearing plates 02-CS, lower grooved tracks 03-CS, ball bearings and cages 04-CS, upper grooved tracks 05-CS, gear rings 06-CS (and, in an embodiment, 50-tooth spur gear rings), gears 07-CS (and, in an embodiment, 12-tooth idler gears), and baskets 09-CS, the plurality of which components may be contained by a cassette tray 01-CS and a cover 08-CS. In this embodiment, the configuration and size of idler gears may be varied to accommodate different distances between the baskets, etc. In such an embodiment, a cassette may comprise a plurality of growing sites (i.e., the plurality of baskets) for plants. It will be apparent that such a cassette with the plurality of components described in this paragraph may be configured to occupy and move within the enclosure. Furthermore, a plurality of such cassettes may be complimentarily configured (such as the tray and cover of two such cassettes forming two half-circles) to occupy and move within the enclosure. Such configuration of cassettes allows for further variation in the number of plant sites of the fully-assembled plurality of cassettes. It will be apparent that at least one cassette in this embodiment will also be a motor-driven cassette to facilitate motorized movement of the cassettes and baskets.

Figure 10:
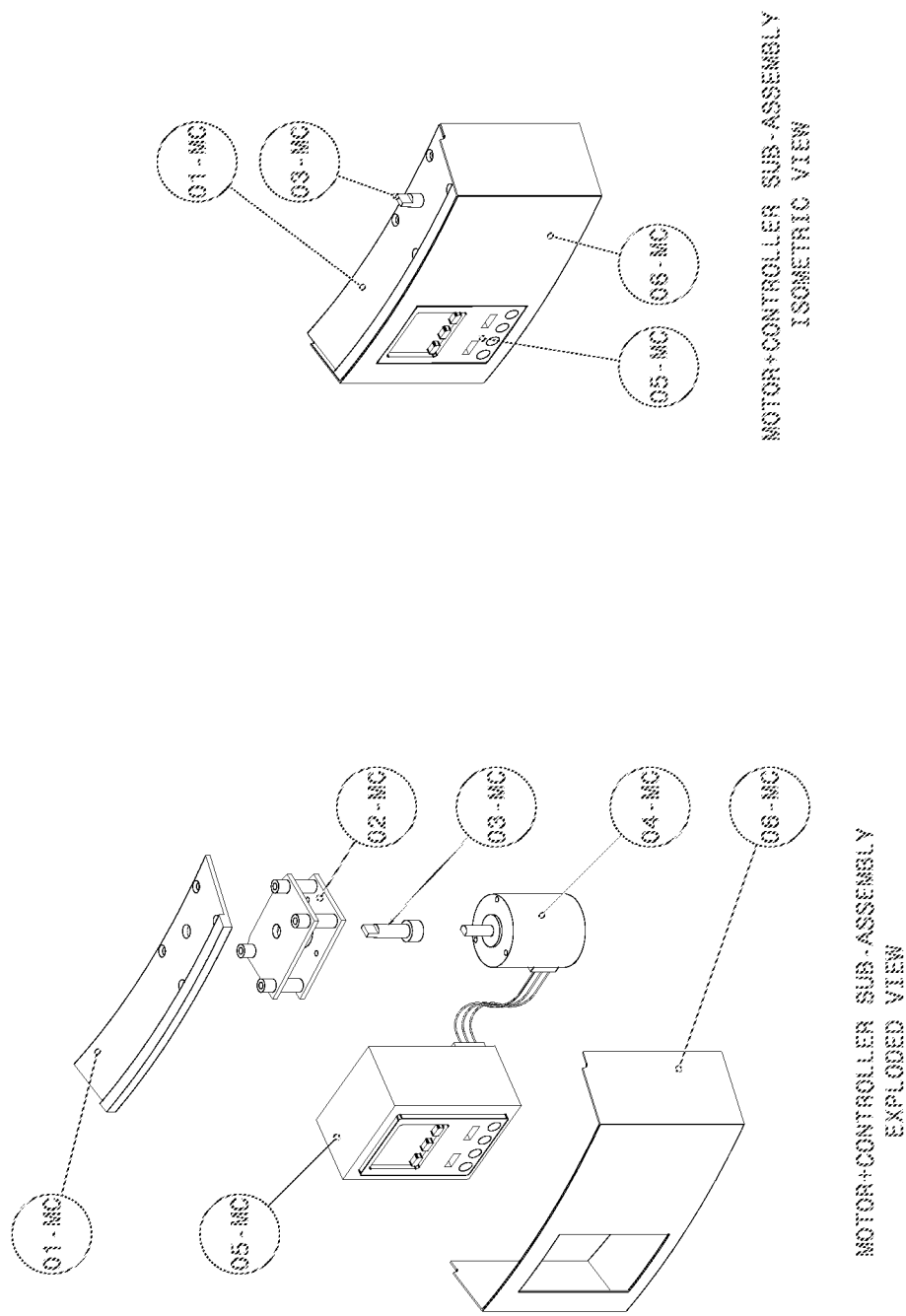
FIG. 10 shows views of a motor and controller assembly of an apparatus for growing plants, in accordance with an exemplary embodiment of the present disclosure.
Figure 11:
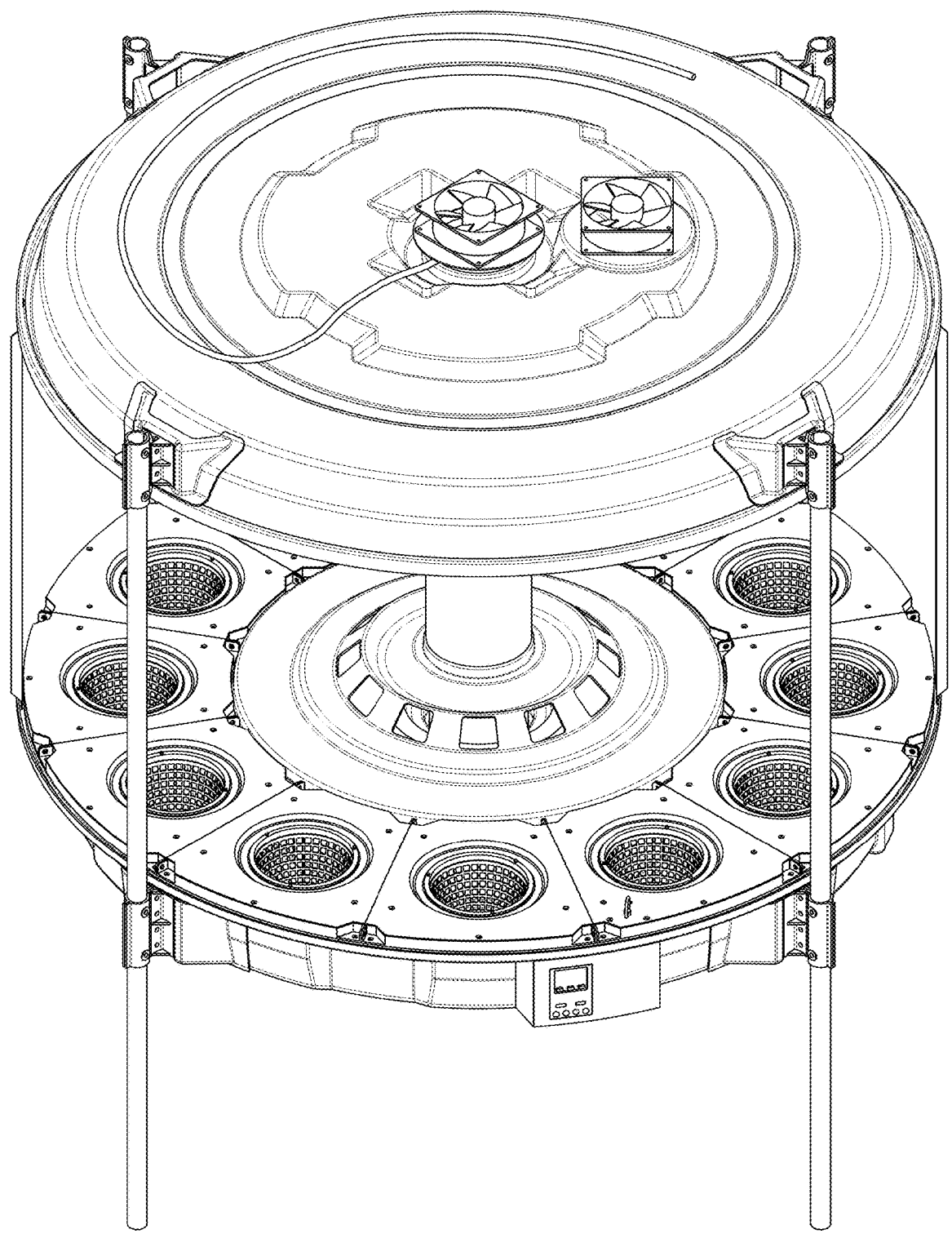
FIG. 11 shows a view of an apparatus for growing plants, in accordance with an exemplary embodiment of the present disclosure.
Figure 12:
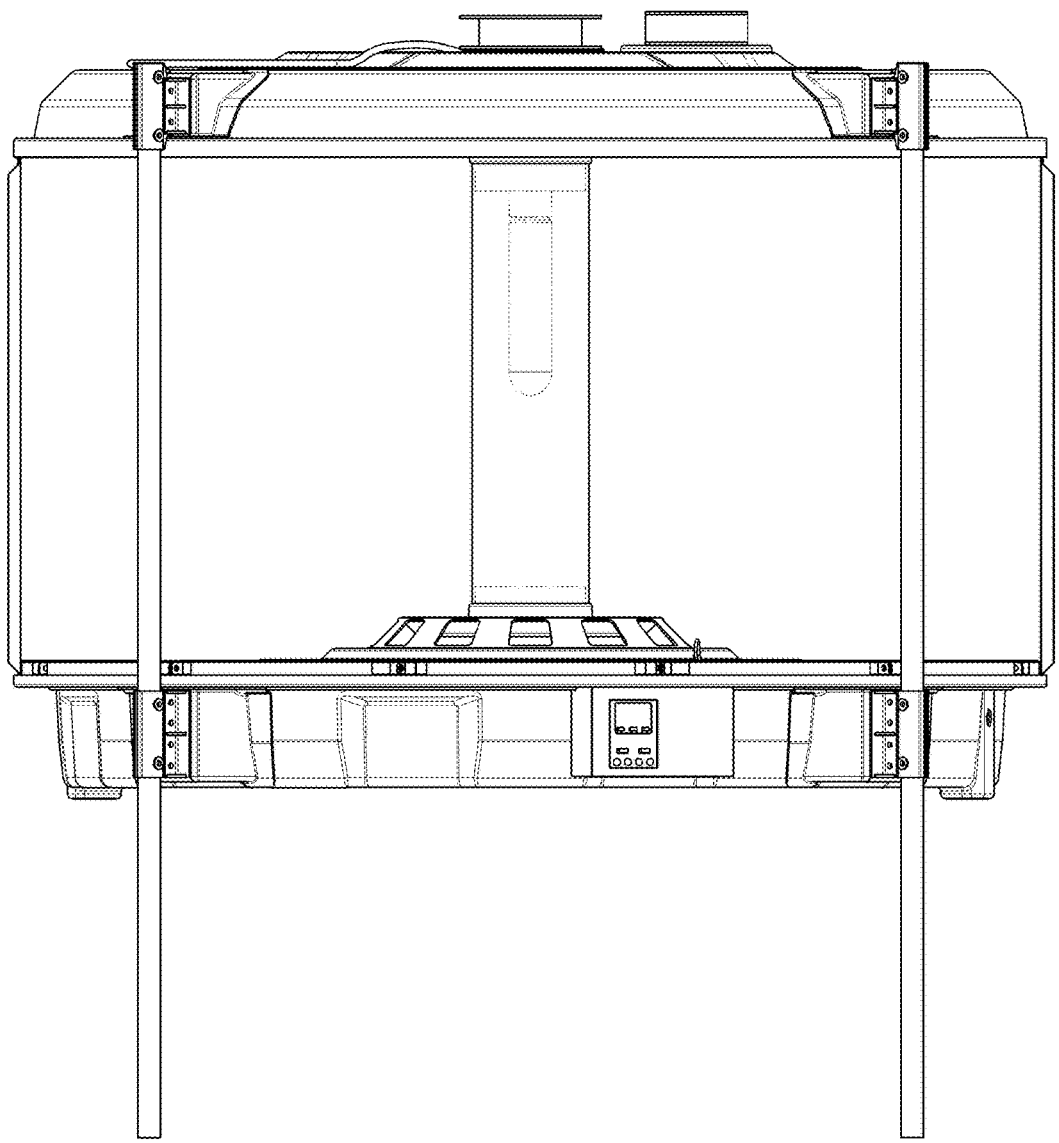
FIG. 12 shows another view of an apparatus for growing plants, in accordance with an exemplary embodiment of the present disclosure.

In an embodiment as shown in FIG. 10, the motor and controller sub-assembly comprises a mounting plate 01-MC, an offset motor mounting plate 02-MC, a slotted drive pin 03-MC, a motor 04-MC (which motor may be a servo or stepper motor, for example), a controller 05-MC and a cover panel 06-MC. The controller is preferably a solid state programmable control module. The controller may control operation of the motor to vary rotational speed, direction, frequency and intervals of the cassettes. The controller may also control the environmental conditions of the apparatus (such as a light source, fan or fans and the like.) Control of the environmental conditions may be accomplished with ports for connection, temperature, humidity and light sensors that may be operatively coupled to the exhaust and intake fans.

The system and apparatus disclosed herein may be used for growing plants hydroponically or aeroponically. Specifically, the apparatus of the system may be used in conjunction with nutrients to deliver nutrient fluid into the enclosure and to the plurality of plant baskets. Accordingly, plants received in the plurality of baskets, may receive nutrient, to grow plants. The system and apparatus of the present disclosure further enables in providing a controlled environment to grow the plants. More specifically, the system enables in providing the controlled environment by controlling airflow, light and exposure of the plants thereto within the enclosure of the assembly.

An exemplary nutrient delivery method for the system and apparatus disclosed herein includes "ebb and flow/flooding" whereby the baskets include an inert medium that anchors roots of the plants, which inert medium may receive water and mineral nutrients from a nutrient delivery mechanism and passively deliver such water and nutrients to the roots of the plants. Alternatively, the nutrients may be delivered periodically and automatically in specified intervals (i.e., a "run-to-waste" method). Another exemplary nutrient delivery mechanism is "deep water culture" whereby the baskets include a solution of nutrient-rich, oxygenated water in which plant roots are received. Yet another nutrient delivery method comprises nutrient film technique, whereby a shallow nutrient-filled stream of solution is present in the trough and is circulated and recirculated past roots of the plants. Nutrient material may also be delivered via "drip irrigation", whereby nutrient fluid is dripped slowly onto the roots of the plants, or may be introduced to the plants in mist form or as part of the otherwise ambient atmosphere within the chamber of the apparatus. It will be apparent that the components of the system and apparatus disclosed herein may accommodate a wide variety of methods of nutrient delivery.

The light source may be selectively operated based on the ambient light or the requirement of the plants. With the plurality of baskets arranged uniformly around the light source, plants in the baskets are able to receive light energy uniformly from the light source. Moreover, the motor enables in uniformly rotating the plurality of baskets, thereby further enabling plants to receive uniform light energy from a light source for the uniform growth of the plants. Additionally, intake and exhaust fans may be operated for regulating temperature or air pressure within the enclosure, thereby providing suitable conditions for growth of the plants.

Also, the apparatus of the system is a closed configuration that encloses the plants, thereby shielding the plants from exposure to ambient light and noise, which avoids adverse and stress-related effects on the plants' growth. That is, the door panels enable closing the apparatus and enclosing the space in which the plants are disposed for the growing process. The door panels allow for light energy provided by the light source towards the plants accommodated in hollow chamber. Most importantly, the plurality of door panels prevents entry of ambient light within the hollow chamber during the plants' night cycle (during which important hormonal processes may occur.) Accordingly, the various above mentioned features of the system enable in providing the controlled environment for growing plants hydroponically.

The apparatus disclosed herein allows for growing conditions in which a plurality of plants can be rotated about their respective axes synchronously, thus permitting growing of a number of plants at once and permitting full exposure of the entirety of all of the plants to a light and/or nutrient source. In such fashion, the growing process is optimized and improved over prior art growing apparatuses, which prior art apparatuses do not provide for rotating a plurality of plants simultaneously within an enclosed chamber. The growing conditions created by the system and apparatus disclosed herein also improves irrigation of plant roots, strengthening of plant stalks, cooling and airflow over the plants being grown, and reducing or eliminating instances of burning or over-exposure of the plants during the growing process.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the claims of the present disclosure.

What is claimed is:

1. An apparatus providing for a controlled environment to grow plants, the apparatus comprising
   a support structure,
   an enclosure,
   at least one basket, said at least one basket for receiving plant material to be grown in the apparatus,
   a concentric rolling track,
   at least one cassette for receiving said at least one basket therein, said at least one cassette comprising a cassette tray, a cover, and an idler gear,
   a trough disposed within said enclosure, said trough configured to receive said at least one basket,
   a lid disposed upon said enclosure,
   a drive mechanism, said drive mechanism operatively coupled to at least one of said at least one basket and said at least one cassette,
   a motor for providing a drive force to the at least one cassette, and
   at least one climate-control mechanism,
   wherein said drive mechanism imparts said drive force to the at least one cassette and the at least one basket to cause the at least one basket to rotate in the at least one cassette and in the enclosure, and
   wherein said concentric rolling track permits said at least one cassette to be moved circumferentially within said enclosure of said apparatus without said at least one cassette bearing directly on or being fixed to said trough.

2. The apparatus of claim 1, wherein said at least one climate-control mechanism comprises at least one of a light source, a fan, a ventilation system, an air passage, and ductwork.

3. The apparatus of claim 1, wherein said lid comprises at least one of a lid closure, an exhaust sleeve, a lamp, a fan adapter, an exhaust, at least one exhaust fan, and at least one duct and corresponding duct shroud.

4. The apparatus of claim 1, wherein said trough comprises at least one of a sump for drainage of the trough, an intake aperture, a baffle, a closure, an air intake sleeve, and an intake fan.

5. The apparatus of claim 1, wherein the at least one cassette comprises a plurality of cassettes, the movement of each cassette of the plurality of cassettes being synchronous.

6. The apparatus of claim 1, the apparatus further comprising a programmable control module for varying the movement of the at least one cassette and for controlling the at least one climate-control mechanism of the apparatus.

7. The apparatus of claim 1, wherein said enclosure can be closed to prohibit light from outside of the enclosure to enter the enclosure.

8. A system for providing a controlled environment to grow plants, wherein the system comprises
   at least one apparatus providing for a controlled environment to grow plants, the apparatus comprising
   a support structure,
   an enclosure,
   at least one basket, said at least one basket for receiving plant material to be grown in the apparatus,
   a concentric rolling track,
   at least one cassette for receiving said at least one basket therein, said at least one cassette comprising a cassette tray, a cover, and an idler gear,
   a trough disposed within said enclosure, said trough configured to receive said at least one basket,
   a lid disposed upon said enclosure,
   a drive mechanism, said drive mechanism operatively coupled to at least one of said at least one basket and said at least one cassette,
   a motor, for providing a drive force to the at least one cassette, and at least one climate-control mechanism, wherein said drive mechanism imparts a said drive force to the at least one cassette and the at least one basket to cause the at least one basket to rotate in the at least one cassette and in the enclosure, and wherein said concentric rolling track permits said at least one cassette to be moved circumferentially within said enclosure of said apparatus without said at least one cassette bearing directly on or being fixed to said trough.

9. The at least one apparatus of claim 8, wherein said at least one climate-control mechanism comprises at least one of a light source, a fan, a ventilation system, an air passage, and ductwork.

10. The at least one apparatus of claim 8, wherein said lid comprises at least one of a lid closure, an exhaust sleeve, a lamp, a fan adapter, an exhaust, at least one exhaust fan, and at least one duct and corresponding duct shroud.

11. The at least one apparatus of claim 8, wherein said trough comprises at least one of a sump for drainage of the trough, an intake aperture, a baffle, a closure, an air intake sleeve, and an intake fan.

12. The at least one apparatus of claim 8, wherein the at least one cassette comprises a plurality of cassettes, the movement of each cassette of the plurality of cassettes being synchronous.

13. The at least one apparatus of claim 8, the apparatus further comprising a programmable control module for varying the movement of the at least one cassette and for controlling the at least one climate-control mechanism of the apparatus.

14. The at least one apparatus of claim 8, wherein said enclosure can be closed to prohibit light from outside of the enclosure to enter the enclosure.

\* \* \* \* \*